(12) United States Patent
Li et al.

(10) Patent No.: US 12,309,433 B2
(45) Date of Patent: May 20, 2025

(54) ON PADDING METHODS FOR NEURAL NETWORK-BASED IN-LOOP FILTER

(71) Applicant: Lemon Inc., Grand Cayman (KY)

(72) Inventors: Yue Li, San Diego, CA (US); Li Zhang, San Diego, CA (US); Kai Zhang, San Diego, CA (US)

(73) Assignee: Lemon Inc.

( * ) Notice: Subject to any disclaimer, the term of this patent is extended or adjusted under 35 U.S.C. 154(b) by 56 days.

(21) Appl. No.: 17/744,060

(22) Filed: May 13, 2022

(65) Prior Publication Data

US 2022/0394309 A1 Dec. 8, 2022

Related U.S. Application Data

(60) Provisional application No. 63/191,121, filed on May 20, 2021.

(51) Int. Cl.
*H04N 19/00* (2014.01)
*G06T 9/00* (2006.01)
*H04N 19/124* (2014.01)
*H04N 19/184* (2014.01)
*H04N 19/82* (2014.01)

(52) U.S. Cl.
CPC .............. *H04N 19/82* (2014.11); *G06T 9/002* (2013.01); *H04N 19/124* (2014.11); *H04N 19/184* (2014.11)

(58) Field of Classification Search
CPC .... H04N 19/82; H04N 19/124; H04N 19/184; G06T 9/002
See application file for complete search history.

(56) References Cited

U.S. PATENT DOCUMENTS

| | | | |
|---|---|---|---|
| 2019/0082193 A1* | 3/2019 | Sun | H04N 19/82 |
| 2019/0238883 A1* | 8/2019 | Chen | H04N 19/56 |
| 2019/0281273 A1* | 9/2019 | Lin | H04N 19/82 |
| 2019/0289327 A1* | 9/2019 | Lin | G06N 3/045 |
| 2019/0394465 A1* | 12/2019 | Moon | H04N 19/105 |
| 2021/0400311 A1* | 12/2021 | Hsiao | H04N 19/80 |
| 2022/0103817 A1* | 3/2022 | Zhang | H04N 19/167 |
| 2022/0116596 A1* | 4/2022 | Zhang | H04N 19/80 |
| 2022/0132117 A1* | 4/2022 | Zhang | H04N 19/14 |

(Continued)

OTHER PUBLICATIONS

Bross, B., et al., "Versatile Video Coding (Draft 10)," http://phenix.it-sudparis.eu/jvet/doc_end_user/current_document.php?id=10399, Jul. 15, 2022, 1 page.

(Continued)

*Primary Examiner* — Zhihan Zhou
(74) *Attorney, Agent, or Firm* — Conley Rose, P.C.

(57) ABSTRACT

A method implemented by a video coding apparatus. The method includes determining, in real time, padding dimensions for padding samples to be applied to a video unit of a video for in-loop filtering, wherein $d_1$, $d_2$, $d_3$, and $d_4$ represent the padding dimensions corresponding to top, bottom, left, and right boundaries of the video unit, respectively; and performing a conversion between a video unit and a bitstream of the video based on the padding dimensions that were determined. A corresponding video coding apparatus and non-transitory computer-readable recording medium are also disclosed.

19 Claims, 20 Drawing Sheets

(56) References Cited

U.S. PATENT DOCUMENTS

| | | | | |
|---|---|---|---|---|
| 2022/0141461 | A1* | 5/2022 | Zhang | H04N 19/174 375/240.29 |
| 2022/0159246 | A1* | 5/2022 | Zhang | H04N 19/11 |
| 2022/0312008 | A1* | 9/2022 | Wang | H04N 19/82 |
| 2023/0080321 | A1* | 3/2023 | Liu | H04N 19/563 375/240.02 |
| 2023/0081202 | A1* | 3/2023 | Liu | H04N 19/563 375/240.02 |
| 2023/0090209 | A1* | 3/2023 | Liu | H04N 19/117 375/240.16 |
| 2023/0091813 | A1* | 3/2023 | Liu | H04N 19/132 375/240.02 |
| 2023/0107774 | A1* | 4/2023 | Zhang | H04N 19/174 375/236 |
| 2023/0156186 | A1* | 5/2023 | Wang | H04N 19/186 375/240.02 |
| 2023/0396796 | A1* | 12/2023 | Deng | H04N 19/563 |

OTHER PUBLICATIONS

Suehring, K., https://vcgit.hhi.fraunhofer.de/jvet/VVCSoftware_VTM/-/tags/VTM-10.0, Jul. 15, 2022, 2 pages.

Document: JVET-L0147, Lim, S-C., et al., "CE2: Subsampled Laplacian calculation (Test 6.1, 6.2, 6.3, and 6.4)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0242, Taquet, J., et al., "E5: Results of tests CE5-3.1 to CE5-3.4 on Non-Linear Adaptive Loop Filter.," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.

Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

Document: JVET-T0041-v4, "Methodology and reporting template for neural network coding tool testing," Joint Video Experts Team (JVET) of ITU-T SG 16 WP 3 and ISO/IEC JTC 1/SC 29 20th Meeting: by teleconference, Oct. 7-16, 2020, 14 pages.

Timofte, R., et al., "DIV2K dataset: DIVerse 2K resolution high quality images as used for the challenges @ NTIRE (CVPR 2017 and CVPR 2018) and @ PIRM (ECCV 2018)," https://data.vision.ee.ethz.ch/cvl/DIV2K/, 2017, 6 pages.

Ma, D., et al., "BVI-DVC: A Training Database for Deep Video Compression." arXiv preprint arXiv:2003.13552, Oct. 8, 2020, 11 pages.

Document: JVET-N1010-v1, Bossen, F., et al., "JVET common test conditions and software reference configurations for SDR video," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Balle, J., et al., "End-to-end optimization of nonlinear transform codes for perceptual quality," In Picture Coding Symposium (PCS) IEEE, Oct. 17, 2016, 5 pages.

Theis, L., et al., "Lossy image compression with compressive autoencoders," Published as a conference paper at ICLR, arXiv preprint arXiv:1703.00395, Mar. 1, 2017, 19 pages.

Li, J., et al., "Fully Connected Network-Based Intra Prediction for Image Coding," IEEE Transactions on Image Processing 27, 2018, pp. 3236-3247.

Dai, Y., "A Convolutional Neural Network Approach for Post-Processing in HEVC Intra Coding," arXiv:1608.06690v2, [cs.MM] Oct. 29, 2016, 12 pages.

Song, R., et al., "Neural Network-Based Arithmetic Coding of Intra Prediction Modes in HEVC," In VCIP, IEEE, 2017, 4 pages.

Pfaff, J., et al., "Neural network based intra prediction for video coding," In Applications of Digital Image Processing XLI, vol. 10752, International Society for Optics and Photonics, 1075213, Sep. 17, 2018, 7 pages.

* cited by examiner

700

| | | | | | | | |
|---|---|---|---|---|---|---|---|
| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |
| $p3_4$ | $p2_4$ | $p1_4$ | $p0_4$ | $q0_4$ | $q1_4$ | $q2_4$ | $q3_4$ |
| $p3_5$ | $p2_5$ | $p1_5$ | $p0_5$ | $q0_5$ | $q1_5$ | $q2_5$ | $q3_5$ |
| $p3_6$ | $p2_6$ | $p1_6$ | $p0_6$ | $q0_6$ | $q1_6$ | $q2_6$ | $q3_6$ |
| $p3_7$ | $p2_7$ | $p1_7$ | $p0_7$ | $q0_7$ | $q1_7$ | $q2_7$ | $q3_7$ | first 4 lines (rows 0–3)

second 4 lines (rows 4–7)

FIG. 7

Residual block

ON PADDING METHODS FOR NEURAL NETWORK-BASED IN-LOOP FILTER

CROSS-REFERENCE TO RELATED APPLICATIONS

This patent application claims the benefit of U.S. Provisional Patent Application No. 63/191,121 filed May 20, 2021, by Lemon, Inc., and titled "On Padding Methods For Neural Network-Based In-Loop Filter," which is hereby incorporated by reference.

TECHNICAL FIELD

The present disclosure is generally related to video coding and, in particular, to the in-loop filter in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques that determine, in real time, padding dimensions for padding samples to be applied to a video unit for in-loop filtering. Thus, the size of the padding area may be adjusted to accommodate the different slices of different types and/or different temporal layers of a multilayer bitstream. Thus, the video coding process is improved relative to conventional video coding techniques.

A first aspect relates to a method implemented by a coding apparatus. The method includes determining, in real time, padding dimensions for padding samples to be applied to a video of a video unit for in-loop filtering, wherein $d_1$, $d_2$, $d_3$, and $d_4$ represent the padding dimensions corresponding to top, bottom, left, and right boundaries of the video unit, respectively; and performing a conversion between the video unit and a bitstream of the video based on the padding dimensions that were determined.

Optionally, in any of the preceding aspects, another implementation of the aspect provides that $d_1$, $d_2$, $d_3$, and $d_4$ each have a different value, that $d_1$, $d_2$, $d_3$, and $d_4$ each have a same value, or that $d_1=d_2$ and $d_3=d_4$.

Optionally, in any of the preceding aspects, another implementation of the aspect provides that indications corresponding to the padding dimensions are included in the bitstream.

Optionally, in any of the preceding aspects, another implementation of the aspect provides that at least one of the padding dimensions is based on a location of the video unit relative to a parent video unit that was partitioned to obtain the video unit, and wherein the padding dimensions corresponding to external boundaries of the parent video unit are different than the padding dimensions corresponding to internal boundaries of the parent video unit.

Optionally, in any of the preceding aspects, another implementation of the aspect provides that at least one of the padding dimensions is based on a size of the video unit, a color format, a channel type, a slice type, or a partitioning tree type.

Optionally, in any of the preceding aspects, another implementation of the aspect provides that at least one of the padding dimensions is based on which temporal layer the video unit belongs to, or is based on reference picture information.

Optionally, in any of the preceding aspects, another implementation of the aspect provides that at least one of the padding dimensions is based on a type of neural network (NN) in-loop filtering method applied to the video unit or whether the NN in-loop filtering method is applied to the video unit.

Optionally, in any of the preceding aspects, another implementation of the aspect provides that the video unit has a video unit size dependent on at least one of a slice resolution and a quantization parameter (QP), and wherein a parent video unit is a slice.

Optionally, in any of the preceding aspects, another implementation of the aspect provides that the padding dimensions define a padding area around the video unit, and wherein the method further comprises padding the padding area with the padding samples when at least one neighboring sample outside the video unit is unavailable.

Optionally, in any of the preceding aspects, another implementation of the aspect provides padding a boundary of the video unit with the padding samples when neighboring samples outside the video unit and along the boundary are unavailable.

Optionally, in any of the preceding aspects, another implementation of the aspect provides that the padding dimensions define a padding area around the video unit, and wherein the method further comprises padding the padding area using a padding method comprising zero padding, reflection padding, replication padding, constant padding, or mirror padding.

Optionally, in any of the preceding aspects, another implementation of the aspect provides that the padding method used for padding the padding area is based on a size of the video unit.

Optionally, in any of the preceding aspects, another implementation of the aspect provides that a padding method used to generate padding samples outside the video unit is based on a type of neural network (NN) filtering method applied to the video unit, or based on whether the NN filtering method is applied to the video unit.

Optionally, in any of the preceding aspects, another implementation of the aspect provides that a padding method used to generate the padding samples outside the video unit is based on a channel type, a slice type, or on which temporal layer the video unit belongs to, and wherein a neural network (NN) filter is applied to the padding samples.

Optionally, in any of the preceding aspects, another implementation of the aspect provides that a granularity of a neural network (NN) filter model to be applied to the padding samples is pre-defined, included in a bitstream, derived, or based on a dimension of the video unit.

Optionally, in any of the preceding aspects, another implementation of the aspect provides that a granularity of a neural network (NN) filter model to be applied to the padding samples is based on a quantization parameter (QP) and a resolution of the video unit.

Optionally, in any of the preceding aspects, another implementation of the aspect provides that binarization of a neural network (NN) filter model index corresponding to the NN filter model to be applied to the padding samples is based on a maximum number allowed for a level higher than the video unit, wherein the level higher is a slice, a picture, or a sequence level, and wherein the NN filter model index is binarized as truncated unary code or truncated binary code.

Optionally, in any of the preceding aspects, another implementation of the aspect provides that the conversion includes encoding the video unit into the bitstream.

Optionally, in any of the preceding aspects, another implementation of the aspect provides that the conversion includes decoding the video unit from the bitstream.

An apparatus for processing video data comprising a processor and a non-transitory memory with instructions thereon, wherein the instructions upon execution by the processor, cause the processor to: determine, in real time, padding dimensions for padding samples to be applied to a video unit of a video for in-loop filtering, wherein $d_1$, $d_2$, $d_3$, and $d_4$ represent the padding dimensions corresponding to the top, bottom, left, and right boundaries of the video unit, respectively; and perform a conversion between the video unit and a bitstream of the video based on the padding dimensions that were determined.

A non-transitory computer-readable recording medium storing a bitstream of a video which is generated by a method performed by a video processing apparatus, wherein the method comprises: determining, in real time, padding dimensions for padding samples to be applied to a video unit of a video for in-loop filtering, wherein $d_1$, $d_2$, $d_3$, and $d_4$ represent the padding dimensions corresponding to the top, bottom, left, and right boundaries of the video unit, respectively; and generating the bitstream based on the padding dimensions that were determined.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of pixels involved in filter on/off decision and strong/weak filter selection.

DETAILED DESCRIPTION

Figure 1:
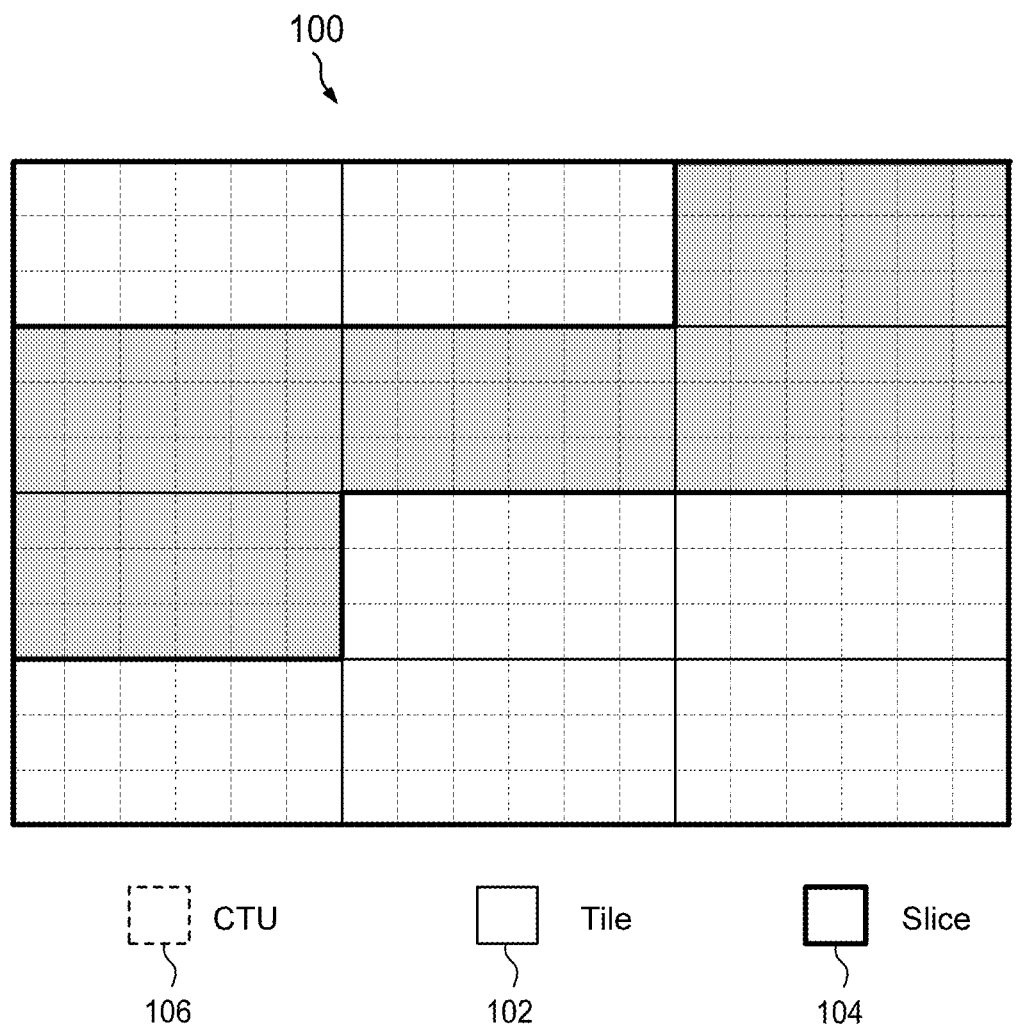
FIG. 1 is an example of raster-scan slice partitioning of a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for ease of understanding and not for limiting scope of the disclosed techniques. As such, the techniques described herein are applicable to other video codec protocols and designs also.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. Y'CbCr, or Y Pb/Cb Pr/Cr, also written as $YC_BC_R$ or $Y'C_BC_R$, is a family of color spaces used as a part of the color image pipeline in video and digital photography systems. Y' is the luma component and $C_B$ and $C_R$ (a.k.a., Cb and Cr) are the blue-difference and red-difference chroma components. Y' (with prime) is distinguished from Y, which is luminance, meaning that light intensity is nonlinearly encoded based on gamma corrected RGB primaries. Each of the color components (e.g., R, B, G, Y, etc.) may be referred to as a color channel or a color channel type.

Chroma subsampling is the practice of encoding images by implementing less resolution for chroma information than for luma information, taking advantage of the human visual system's lower acuity for color differences than for luminance.

Color formats (such as 4:4:4, 4:2:2, and 4:2:0) are discussed.

For 4:4:4: chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 is an example of raster-scan slice partitioning of a picture 100, where the picture is divided into twelve tiles 102 and three raster-scan slices 104. As shown, each of the tiles 102 and raster-scan slices 104 contains a number of CTUs 106.

Figure 2:
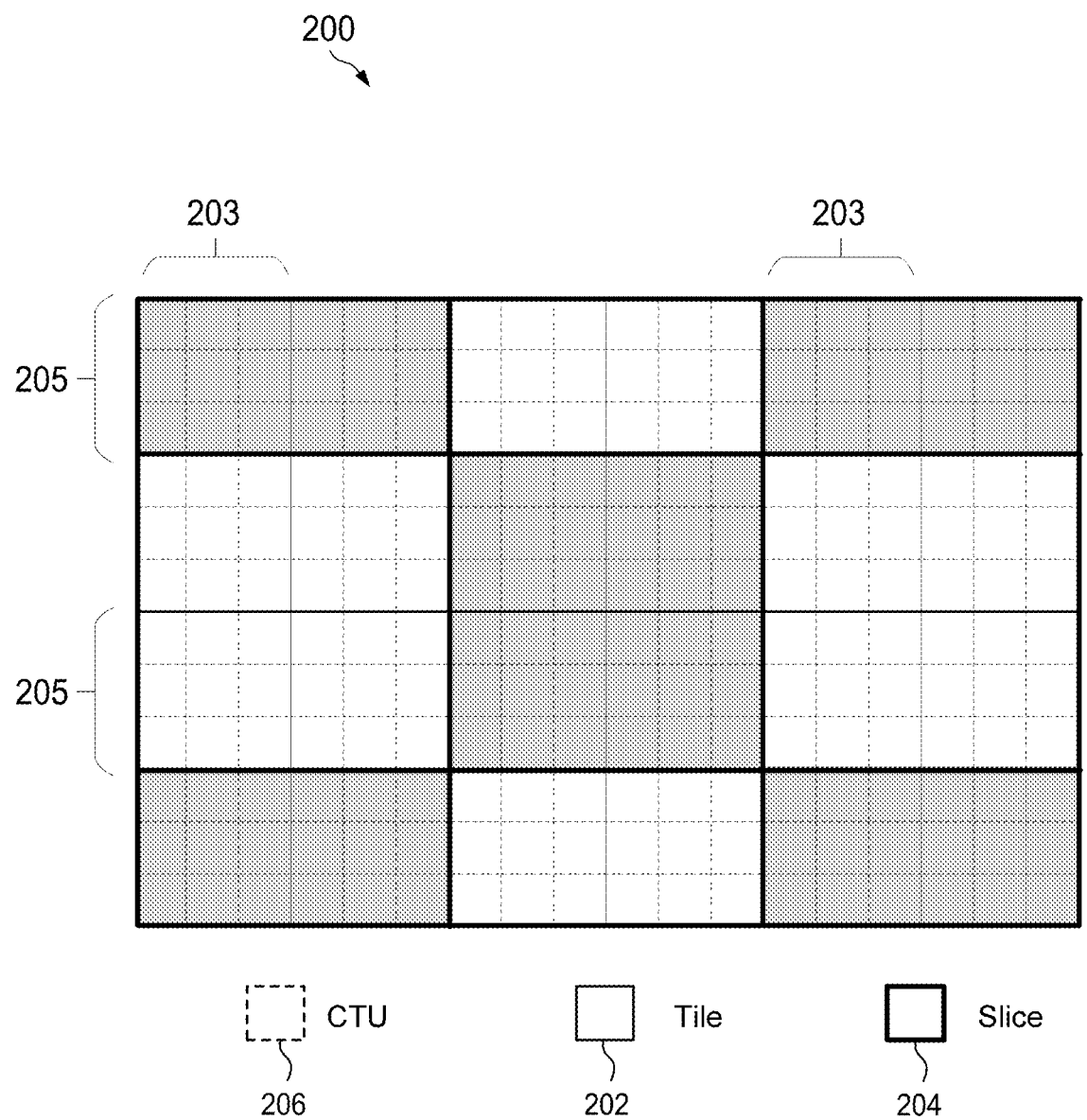
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and rectangular slices 204 contains a number of CTUs 206.

Figure 3:
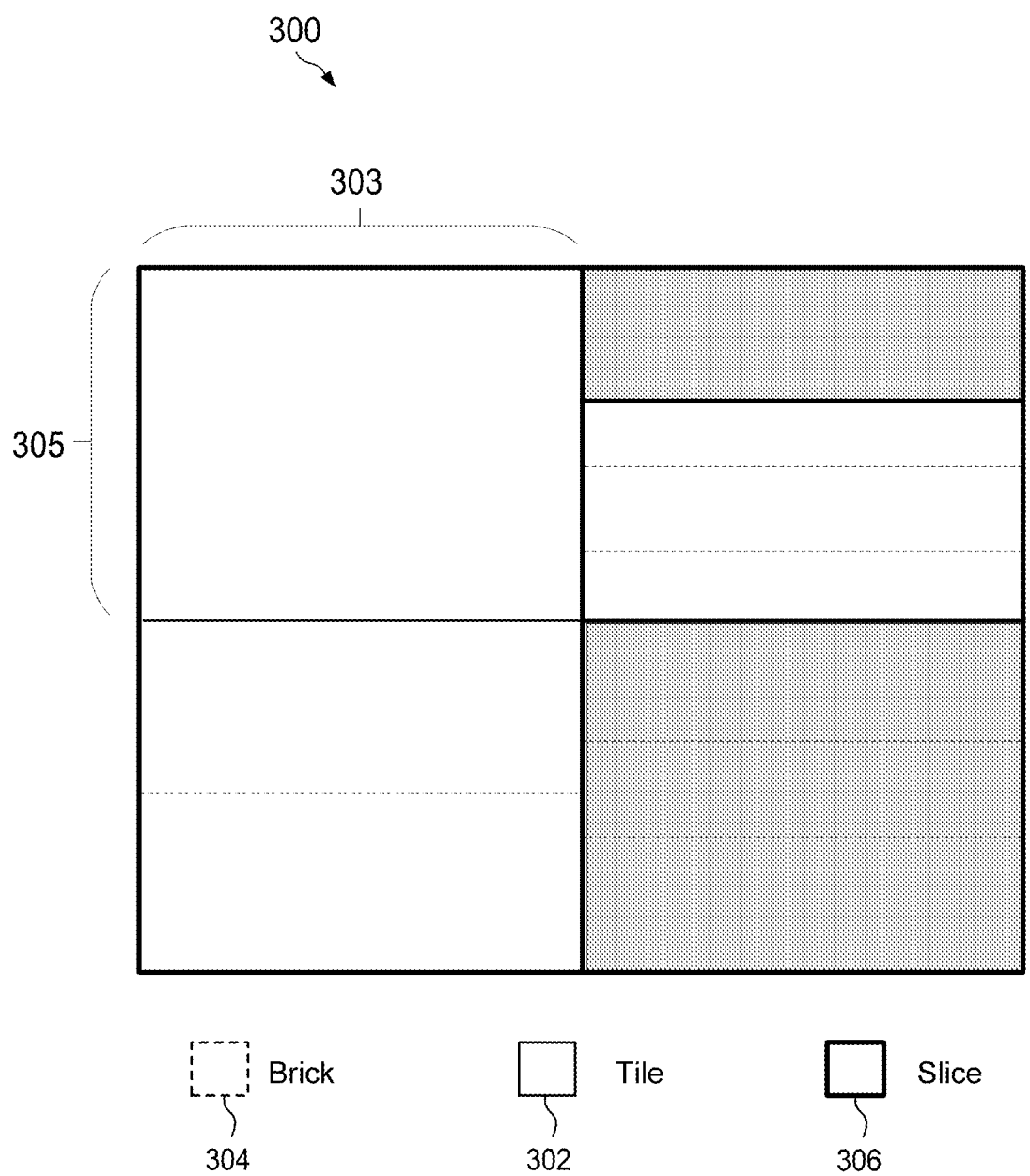
FIG. 3 is an example of a picture partitioned into tiles, bricks, and rectangular slices.

FIG. 3 is an example of a picture 300 partitioned into tiles, bricks, and rectangular slices according to the VVC specification, where the picture 300 is divided into four tiles 302 (two tile columns 303 and two tile rows 305), eleven bricks 304 (the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. InVVC, the coding tree unit (CTU) size, which is signaled in a sequence parameter set (SPS) by the syntax element log 2_ctu_size_minus2, could be as small as 4×4. The sequence parameter set raw byte sequence payload (RBSP) syntax is below.

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | ue(v) |
| chroma_format_idc | ue(v) |
| if( chroma_format_idc = = 3 ) | |
|   separate_colour_plane_flag | u(1) |
| pic_width_in_luma_samples | ue(v) |
| pic_height_in_luma_samples | ue(v) |
| conformance_window_flag | u(1) |
| if( conformance_window_flag) { | |
|   conf_win_left_offset | ue(v) |
|   conf_win_right_offset | ue(v) |
|   conf_win_top_offset | ue(v) |
|   conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 ); | |
|   i <= sps_max_sub_layers_minus1; i++) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |

-continued

```
seq_parameter_set_rbsp( ) {                                          Descriptor
  for( i = 0; i < !rpl1_same_as_rpl0_flag ? 2 : 1; i++) {
    num_ref_pic_lists_in_sps[ i ]                                    ue(v)
    for( j = 0; j < num_ref_pic_lists_in_sps[ i ]; j++)
      ref_pic_list_struct( i, j )
  }
  qtbtt_dual_tree_intra_flag                                         u(1)
  log2_ctu_size_minus2                                               ue(v)
  log2_min_luma_coding_block_size_minus2                             ue(v)
  partition_constraints_override_enabled_flag                        u(1)
  sps_log2_diff_min_qt_min_cb_intra_slice_luma                       ue(v)
  sps_log2_diff_min_qt_min_cb_inter_slice                            ue(v)
  sps_max_mtt_hierarchy_depth_inter_slice                            ue(v)
  sps_max_mtt_hierarchy_depth_intra_slice_luma                       ue(v)
  if( sps_max_mtt_hierarchy_depth_intra_slice_luma != 0 ) {
    sps_log2_diff_max_bt_min_qt_intra_slice_luma                     ue(v)
    sps_log2_diff_max_tt_min_qt_intra_slice_luma                     ue(v)
  }
  if( sps_max_mtt_hierarchy_depth_inter_slices != 0 ) {
    sps_log2_diff_max_bt_min_qt_inter_slice                          ue(v)
    sps_log2_diff_max_tt_min_qt_inter_slice                          ue(v)
  }
  if( qtbtt_dual_tree_intra_flag) {
    sps_log2_diff_min_qt_min_cb_intra_slice_chroma                   ue(v)
    sps_max_mtt_hierarchy_depth_intra_slice_chroma                   ue(v)
    if ( sps_max_mtt_hierarchy_depth_intra_slice_chroma !=
      0 ) {
      sps_log2_diff_max_bt_min_qt_intra_slice_chroma                 ue(v)
      sps_log2_diff_max_tt_min_qt_intra_slice_chroma                 ue(v)
    }
  }
  ...
  rbsp_trailing_bits( )
}
``` log 2_ctu_size_minus2 plus 2 specifies the luma coding tree block size of each CTU.

log 2_min_luma_coding_block_size_minus2 plus 2 specifies the minimum luma coding block size.

The variables CtbLog 2SizeY, CtbSizeY, MinCbLog 2SizeY, MinCbSizeY, MinTbLog 2SizeY, MaxTbLog 2SizeY, MinThSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows.

$$\text{CtbLog 2SizeY} = \log 2\_ctu\_size\_minus2+2 \tag{7-9}$$

$$\text{CtbSizeY} = 1 << \text{Ctb Log 2SizeY} \tag{7-10}$$

$$\text{MinCb Log 2SizeY} = \log 2\_min\_luma\_coding\_block\_size\_minus2+2 \tag{7-11}$$

$$\text{MinCbSizeY} = 1 << \text{MinCbLog 2SizeY} \tag{7-12}$$

$$\text{MinTb Log 2SizeY} = 2 \tag{7-13}$$

$$\text{MaxTb Log 2SizeY} = 6 \tag{7-14}$$

$$\text{MinTbSizeY} = 1 << \text{MinTb Log 2SizeY} \tag{7-15}$$

$$\text{MaxTbSizeY} = 1 \leq \leq \text{MaxTb Log 2SizeY} \tag{7-16}$$

$$\text{PicWidthInCtbsY} = \text{Ceil}(pic\_width\_in\_luma\_samples + \text{CtbSizeY}) \tag{7-17}$$

$$\text{PicHeightInCtbsY} = \text{Ceil}(pic\_height\_in\_luma\_samples + \text{CtbSizeY}) \tag{7-18}$$

$$\text{PicSizeInCtbsY} = \text{PicWidthInCtbsY} * \text{PicHeightInCtbsY} \tag{7-19}$$

$$\text{PicWidthInMinCbsY} = pic\_width\_in\_luma\_samples / \text{MinCbSizeY} \tag{7-20}$$

$$\text{PicHeightInMinCbsY} = pic\_height\_in\_luma\_samples / \text{MinCbSizeY} \tag{7-21}$$

$$\text{PicSizeInMinCbsY} = \text{PicWidthInMinCbsY} * \text{PicHeightInMinCbsY} \tag{7-22}$$

$$\text{PicSizeInSamplesY} = pic\_width\_in\_luma\_samples * pic\_height\_in\_luma\_samples \tag{7-23}$$

$$\text{PicWidthInSamplesC} = pic\_width\_in\_luma\_samples / \text{SubWidthC} \tag{7-24}$$

$$\text{PicHeightInSamplesC} = pic\_height\_in\_luma\_samples / \text{SubHeightC} \tag{7-25}$$

Figure 4A:
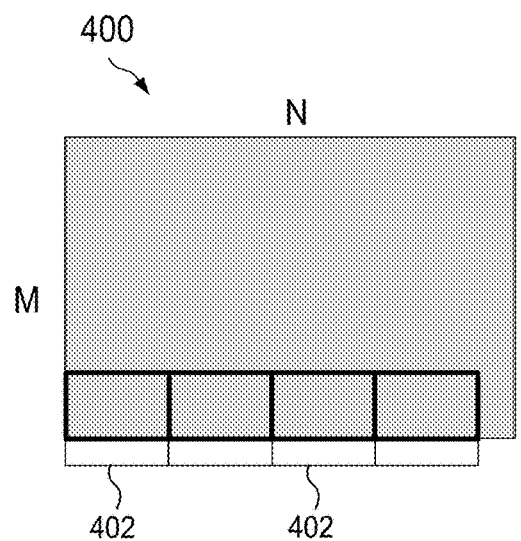
FIG. 4A is an example of coding tree blocks (CTBs) crossing the bottom picture border.
Figure 4B:
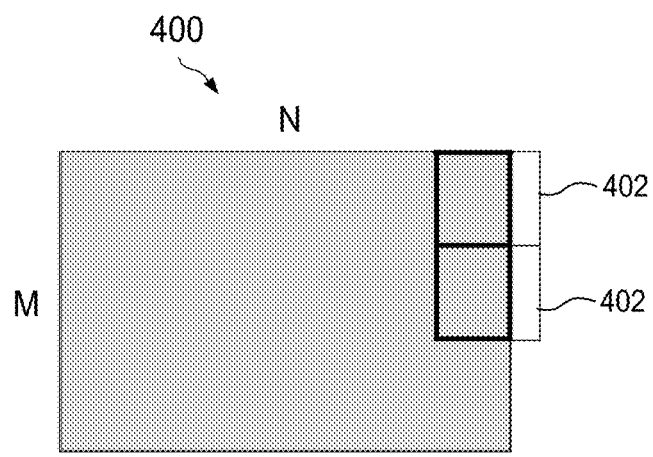
FIG. 4B is an example of CTBs crossing the right picture border.
Figure 4C:
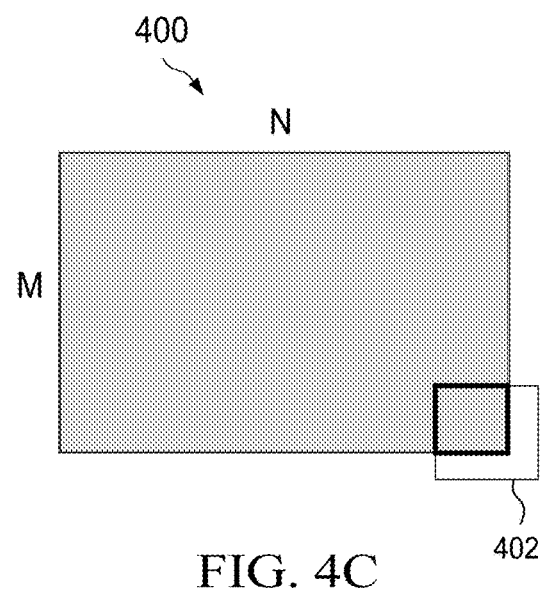
FIG. 4C is an example of CTBs crossing the right bottom picture border.

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size indicated by M×N (typically M is equal to N, as defined in HEVC/VVC), and for a CTB located at a picture (or tile or slice or other kinds of types, picture border is taken as an example) border, K×L samples are within the picture border wherein either K<M or L<N. For those CTBs 402 as depicted in FIG. 4A-4C, the CTB size is still equal to M×N, however, the bottom boundary/right boundary of the CTB is outside the picture 400.

Figure 5:
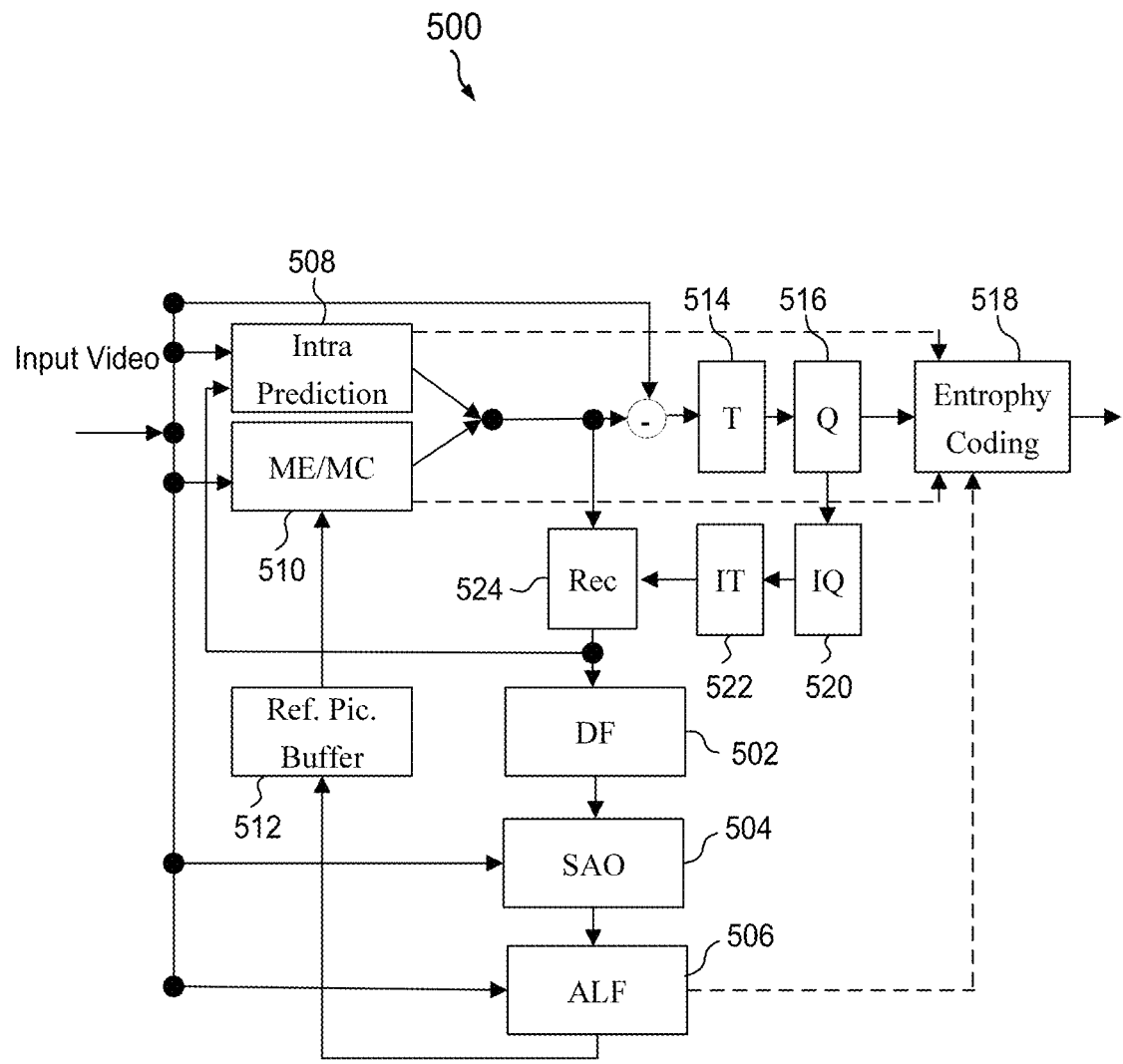
FIG. 5 is an example of an encoder block diagram.

The coding flow of a typical video coder/decoder (a.k.a., codec) is discussed. FIG. 5 is an example of an encoder block diagram of VVC, which contains three in-loop filtering blocks: deblocking filter (DF), sample adaptive offset (SAO) filter, and adaptive loop filter (ALF). Unlike DF, which uses predefined filters, SAO filter and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) filter 504, and an ALF 506. Unlike the DF 502, which uses predefined filters, the SAO filter 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO 504, and the ALF 506 for filtering prior to those images being stored in the reference picture buffer 512.

The input of the DF 502 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
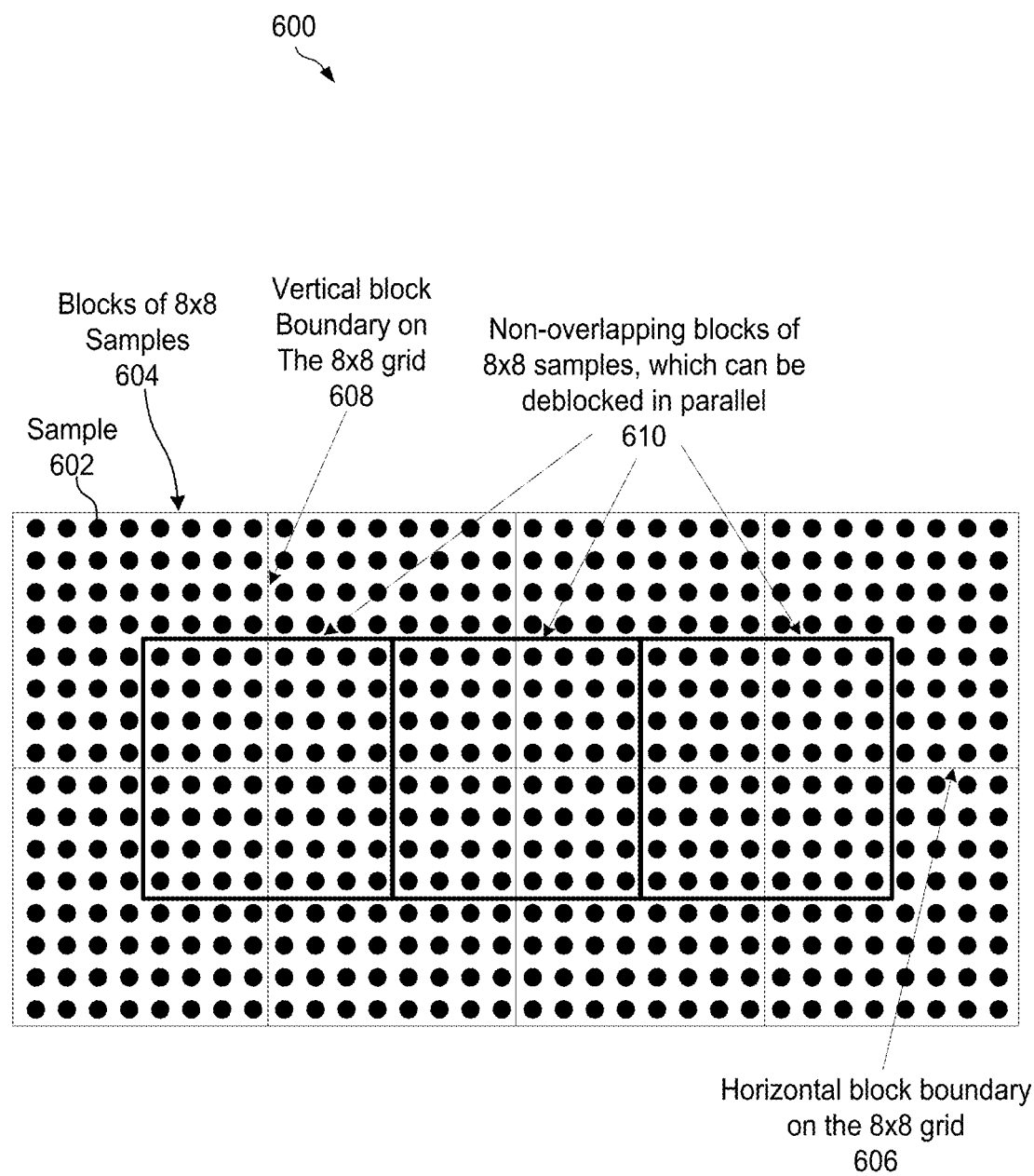
FIG. 6 is an illustration of samples within 8×8 blocks of samples.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of affine motion prediction, alternative temporal motion vector prediction (ATMVP)). For those which are not such boundaries, the filter is disabled.

The boundary strength calculation is discussed. For a transform block boundary/coding subblock boundary, if it is located in the 8×8 grid, the transform block boundary/coding subblock boundary may be filtered and the setting of bS[xD$_i$][yD$_j$] (wherein [xD$_i$][yD$_j$] denotes the coordinate) for this edge is defined in Table 1 and Table 2, respectively.

TABLE 1

Boundary strength (when SPS intra block copy (IBC) is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

FIG. 7 is an example 700 of pixels involved in filter on/off decision and strong/weak filter selection. A wider-stronger luma filter is used only if all of the Condition 1, Condition 2, and Condition 3 are TRUE. The Condition 1 is the "large block condition." This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

bSidePisLargeBlk=((edge type is vertical and p$_0$ belongs to CU with width>=32)||(edge type is horizontal and p$_0$ belongs to CU with height>=32))?TRUE: FALSE bSideQisLargeBlk=((edge type is vertical and q$_0$ belongs to CU with width>=32)||(edge type is horizontal and q$_0$ belongs to CU with height>=32))?TRUE: FALSE Based on bSidePisLargeBlk and bSideQisLargeBlk, the Condition 1 is defined as follows.

Condition 1=(bSidePisLargeBlk||bSidePisLargeBlk)? TRUE:FALSE

Next, if Condition 1 is true, the Condition 2 will be further checked. First, the following variables are derived.

dp0, dp3, dq0, dq3 are first derived as in HEVC
if (p side is greater than or equal to 32)
  dp0 = ( dp0 + Abs( p5$_0$ − 2 * p4$_0$ + p3$_0$ ) + 1 ) >> 1
  dp3 = ( dp3 + Abs( p5$_3$ − 2 * p4$_3$ + p3$_3$ ) + 1 ) >> 1
if (q side is greater than or equal to 32)
  dq0 = ( dq0 + Abs( q5$_0$ − 2 * q4$_0$ + q3$_0$ ) + 1 ) >> 1
  dq3 = ( dq3 + Abs( q5$_3$ − 2 * q4$_3$ + q3$_3$ ) + 1 ) >> 1

Condition 2=(d<β)?TRUE:FALSE where d=dp0+dq0+dp3+dq3.

If Condition 1 and Condition 2 are valid, whether any of the blocks uses sub-blocks is further checked.

```
If (bSidePisLargeBlk)
{
    If (mode block P == SUBBLOCKMODE)
        Sp =5
    else
        Sp =7
}
else
    Sp = 3
If (bSideQisLargeBlk)
{
    If (mode block Q == SUBBLOCKMODE)
        Sq =5
    else
        Sq =7
}
else
    Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived.

```
dpq is derived as in HEVC.
sp3 = Abs( p3 − p0 ), derived as in HEVC
if (p side is greater than or equal to 32)
    if(Sp==5)
        sp3 = ( sp3 + Abs( p5 − p3 ) + 1 ) >> 1
    else
        sp3 = ( sp3 + Abs( p7 − p3 ) + 1 ) >> 1
sq3 = Abs( q0 − q3 ), derived as in HEVC
if (q side is greater than or equal to 32)
    If(Sq==5)
        sq3 = ( sq3 + Abs( q5 − q3 ) + 1 ) >> 1
    else
        sq3 = ( sq3 + Abs( q7 − q3 ) + 1 ) >> 1
```

As in HEVC, StrongFilterCondition=(dpq is less than ($\beta$>>2), $sp_3$+$sq_3$ is less than (3*$\beta$>>5), and Abs($p_0$−$q_0$) is less than (5*$t_C$+1)>>1)? TRUE: FALSE.

A stronger deblocking filter for luma (designed for larger blocks) is discussed.

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples p; for i=0 to Sp−1 and $q_1$ for j=0 to Sq−1 (pi and qi are the i-th sample within a row for filtering vertical edge, or the i-th sample within a column for filtering horizontal edge) in HEVC deblocking described above) are then replaced by linear interpolation as follows.

$p_i'=(f_i*Middle_{s,t}+(64-f_i)*P_s+32)>>6)$, clipped to $p_i\pm tcPD_i$ $q_j'=(g_j*Middle_{s,t}+(64-g_j)*Q_s+32)>>6)$, clipped to $q_1\pm tcPD_j$ where $tcPD_i$ and $tcPD_j$ term is a position dependent clipping described in below and $g_j$, $f_i$, $Middle_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decisions with three conditions are satisfied. The first is for a decision of boundary strength, as well as large block. The proposed filter can be applied when the block width or height which orthogonally crosses the block edge is equal to or larger than 8 in chroma sample domain. The second and third decisions are basically the same as for an HEVC luma deblocking decision, which are on/off decision and strong filter decision, respectively.

In the first decision, boundary strength (bS) is modified for chroma filtering and the conditions are checked sequentially. If a condition is satisfied, then the remaining decisions with lower priorities are skipped.

Chroma deblocking is performed when bS is equal to 2, or bS is equal to 1 when a large block boundary is detected.

The second and third decisions are basically the same as an HEVC luma strong filter decision, which is as follows.

In the second decision: d is then derived as in HEVC luma deblocking. The second decision will be TRUE when d is less than $\beta$.

In the third decision StrongFilterCondition is derived as follows.

$sp_3$=Abs($p_3$−$p_0$), derived as in HEVC $sq_3$=Abs($q_0$−$q_3$), derived as in HEVC As in HEVC design, StrongFilterCondition=(dpq is less than ($\beta$>>2), $sp_3$+$sq_3$ is less than ($\beta$>>3), and Abs($p_0$−$q_0$) is less than (5*$t_C$+1)>>1).

A strong deblocking filter for chroma is discussed. The following strong deblocking filter for chroma is defined.

$p_2'=(3*p_3+2*p_2+p_1+p_0+q_0+4)>>3$ $p_1'=(2*p_3+p_2+2*p_1+p_0+q_0+q_1+4)>>3$ $p_0'=(p_3+p_2+p_1+2*p_0+q_0+q_1+q_2+4)>>3$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with an asymmetrical filter, depending on the result of decision-making process in the boundary strength calculation, a position dependent threshold table is selected from two tables (i.e., Tc7 and Tc3 tabulated below) that are provided to decoder as a side information.

$Tc7=\{6,5,4,3,2,1,1\}$; $Tc3=(6,4,2)$;

$tcPD=(Sp==3)?Tc3:Tc7$;

$tcQD=(Sq==3)?Tc3:Tc7$;

For the P or Q boundaries being filtered with a short symmetrical filter, position dependent threshold of lower magnitude is applied.

$Tc3=\{3,2,1\}$;

Following defining the threshold, filtered $p'_i$ and $q'_i$ sample values are clipped according to tcP and tcQ clipping values.

$p''_i$=Clip3($p'_i+tcP_i,p'_i-tcP_ip'_i$);

$q''_j$=Clip3($q'_j+tcQ_j,q'_j-tcQ_jq'_j$)

where $p'_i$ and $q'_i$ are filtered sample values, $p''_i$ and $q''_j$ are output sample value after the clipping and tcP, tcP, are clipping thresholds that are derived from the VVC tc parameter and rcPD and tcQD. The function Clip3 is a clipping function as it is specified in VVC.

Sub-block deblocking adjustment is discussed.

To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that sub-block boundaries on an 8×8 grid that are close to a coding unit (CU) or an implicit transform unit (TU) boundary is restricted to modify at most two samples on each side.

The following applies to sub-block boundaries that not are aligned with the CU boundary.

```
If (mode block Q == SUBBLOCKMODE && edge !=0) {
   if (!(implicitTU && (edge == (64 / 4))))
      if (edge == 2 || edge == (orthogonalLength – 2) || edge == (56 / 4) || edge == (72 / 4))
         Sp = Sq = 2;
      else
         Sp = Sq = 3;
   else
      Sp = Sq = bSideQisLargeBlk ? 5:3
}
```

Where edge equal to 0 corresponds to CU boundary, edge equal to 2 or equal to orthogonalLength−2 corresponds to sub-block boundary 8 samples from a CU boundary, etc. Where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 8:
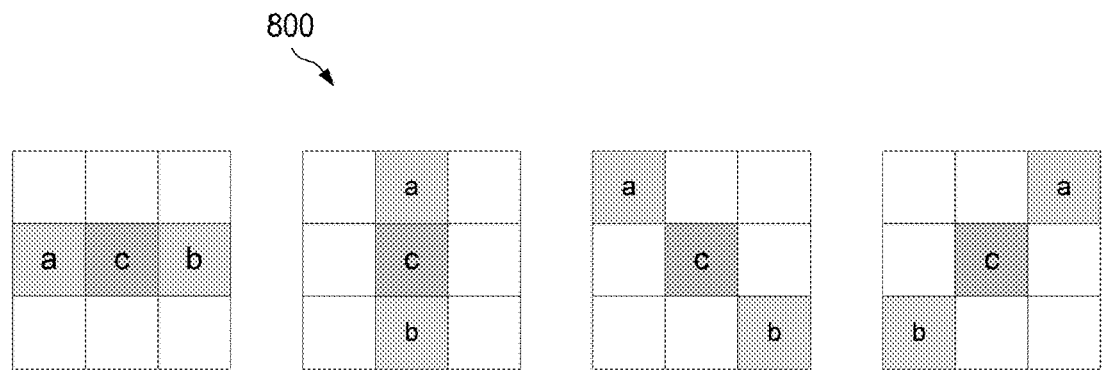
FIG. 8 shows four one dimensional (1-D) directional patterns for edge offset (EO) sample classification.

FIG. 8 shows four one dimensional (1-D) directional patterns 800 for EO sample classification: horizontal (EO class=0), vertical (EO class=1), 135° diagonal (EO class=2), and 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a && c == b) \|\| (c == a && c < b) |
| 3 | (c > a && c == b) \|\| (c == a && c > b) |
| 4 | c > a && c > b |
| 5 | None of the above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2-2 block, based on the direction and activity of local gradients.

Figure 9:
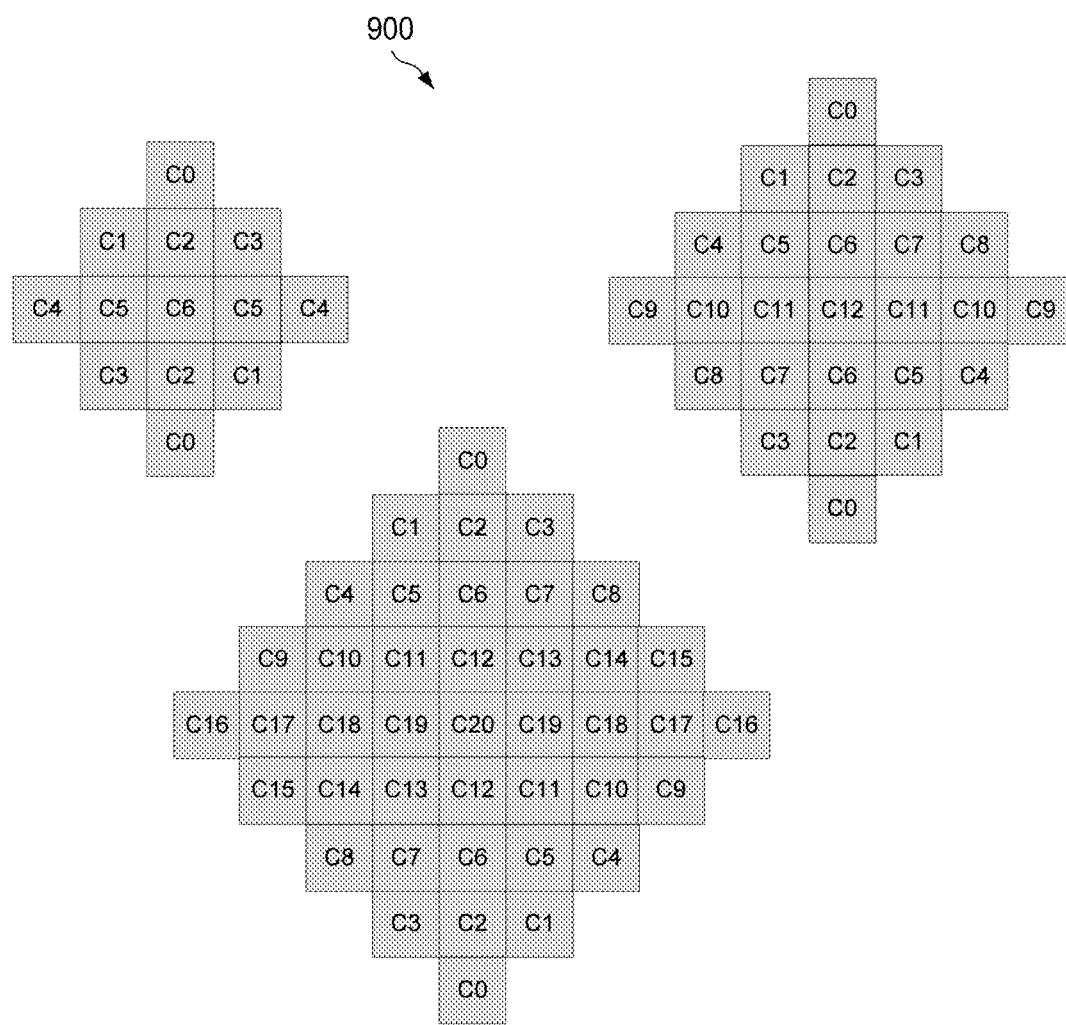
FIG. 9 shows examples of geometry transformation-based adaptive loop filter (GALF) filter shapes.

The filter shape is discussed. FIG. 9 shows examples of GALF filter shapes 900, including on the left a 5×5 diamond, on the right a 7×7 diamond, and in the middle a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0-6 (left), 0-12 (middle), 0-20 (right)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity $\hat{A}$, as follows.

$$C = 5D + \hat{A}. \tag{1}$$

To calculate D and $\hat{A}$, gradients of the horizontal, vertical and two diagonal directions are first calculated using 1-D Laplacian.

$$g_v = \sum_{k=i-2}^{i+3} \sum_{l=j-2}^{j+3} V_{k,l}, \quad V_{k,l} = |2R(k, l) - R(k, l-1) - R(k, l+1)|, \tag{2}$$

$$g_h = \sum_{k=i-2}^{i+3} \sum_{l=j-2}^{j+3} H_{k,l}, \quad H_{k,l} = |2R(k, l) - R(k-1, l) - R(k+1, l)| \tag{3}$$

$$g_{d1} = \sum_{k=i-2}^{i+3} \sum_{l=j-3}^{j+3} D1_{k,l}, \quad D1_{k,l} = |2R(k, l) - R(k-1, l-1) - R(k+1, l+1)| \tag{4}$$

-continued $$g_{d2} = \sum_{k=i-2}^{i+3} \sum_{j=j-2}^{j+3} D2_{k,l}, D2_{k,l} = |2R(k, l) - R(k-1, l+1) - R(k+1, l-1)| \quad (5)$$

Indices i and j refer to the coordinates of the upper left sample in the 2×2 block and R(i, j) indicates a reconstructed sample at coordinate (i, j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â.

For both chroma components in a picture, no classification method is applied, i.e. a single set of ALF coefficients is applied for each chroma component.

Geometric transformation of filter coefficients is discussed.

Figure 10:
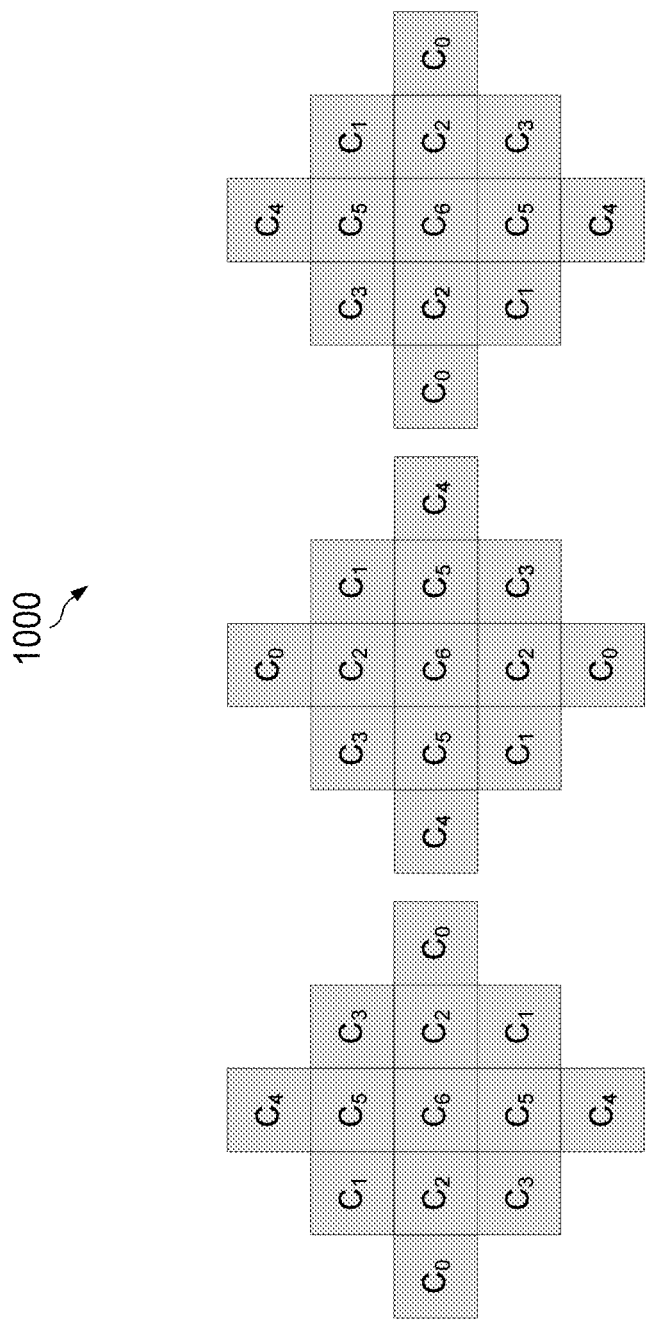
FIG. 10 shows an example of relative coordinates used for the 5×5 diamond filter support.

FIG. 10 shows an example of relative coordinates 1000 used for the 5×5 diamond filter support–diagonal, vertical flip, and rotation, respectively (from left to right).

Before filtering each 2×2 block, geometric transformations such as rotation or diagonal and vertical flipping are applied to the filter coefficients f(k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

Diagonal: $f_D(k,l)=f(l,k)$,

Vertical flip: $f_V(k,l)=f(k,K-l-1)$,

Rotation: $f_R(k,l)=f(K-l-1,k)$. (9)

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 4.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classifications can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are the sum of both sets of coefficients.

The filtering process of a luma component can be controlled at the CU level. A flag is signalled to indicate whether GALF is applied to the luma component of a CU. For a chroma component, whether GALF is applied or not is indicated at picture level only.

The filtering process is discussed. At the decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\Sigma_{k=-L/2}^{L/2}\Sigma_{l=-L/2}^{L/2} f(k,l) \times R(i+k, j+1) \quad (10)$$

Figure 11:
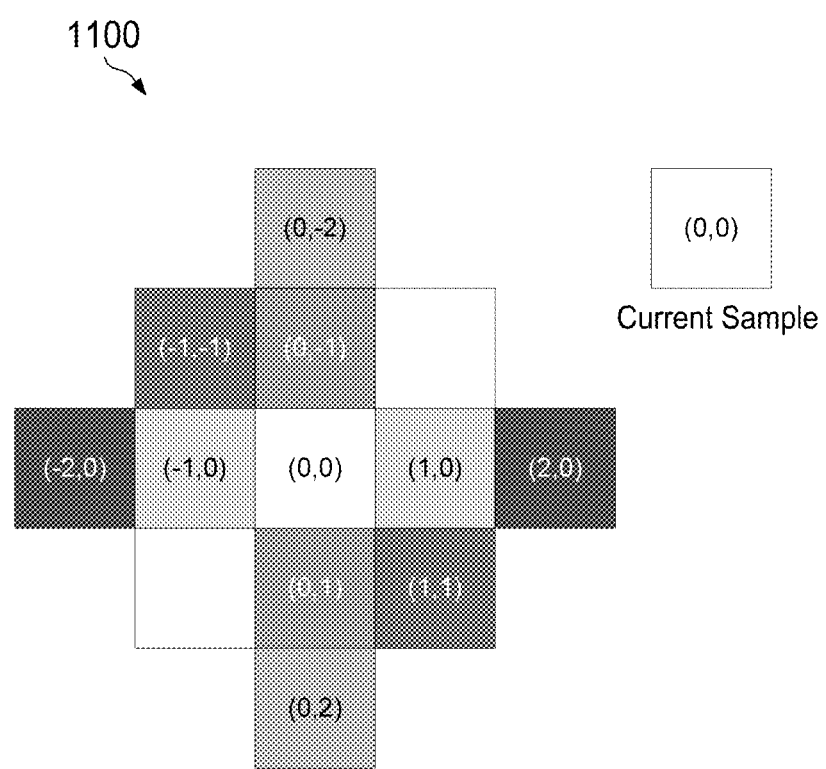
FIG. 11 shows another example of relative coordinates used for the 5×5 diamond filter support.

FIG. 11 shows another example of relative coordinates 1100 used for the 5×5 diamond filter support supposing the current sample's coordinate (i, j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the adaptive loop filter, is performed as follows:

$$O(x,y)=\Sigma_{(i,j)}w(i,j) \cdot l(x+i, y+j), \quad (11)$$

where samples l(x+i, y+j) are input samples, O(x, y) is the filtered output sample (i.e., filter result), and w(i, j) denotes the filter coefficients. In practice, in VTM4.0 it is implemented using integer arithmetic for fixed point precision computations $$O(x, y) = \left( \sum_{i=-\frac{L}{2}}^{\frac{L}{2}} \sum_{j=-\frac{L}{2}}^{\frac{L}{2}} w(i,j) \cdot I(x+i, y+j) + 64 \right) \gg 7, \quad (12)$$

where L denotes the filter length, and where w(i, j) are the filter coefficients in fixed point precision.

The current design of GALF in VVC has the following major changes compared to that in JEM:
1) The adaptive filter shape is removed. Only a 7×7 filter shape is allowed for luma components and a 5×5 filter shape is allowed for chroma components.
2) Signaling of ALF parameters is removed from slice/picture level to CTU level.
3) Calculation of class index is performed in a 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x,y)=I(x,y)+\Sigma_{(i,j)\neq(0,0)} w(i,j) \cdot (l(x+i, y+j)-l(x,y)), \quad (13)$$

where w(i, j) are the same filter coefficients as in equation (11) [excepted w(0, 0) which is equal to 1 in equation (13) while it is equal to $1-\Sigma_{(i, j)\neq(0, 0)} w(i, j)$ in equation (11)].

Using the above filter formula of equation (13), VVC introduces the non-linearity to make ALF more efficient by using a simple clipping function to reduce the impact of neighbor sample values (l(x+i, y+j)) when they are too different with the current sample value (l(x, y)) being filtered.

More specifically, the ALF filter is modified as follows:

$$O'(x,y)=l(x,y)+\Sigma_{(i,j)\neq(0,0)} w(i,j) \cdot K(l(x+i,y+j)-l(x,y), k(i,j)), \quad (14)$$

where K(d, b)=min(b, max(−b, d)) is the clipping function, and k(i, j) are clipping parameters, which depends on the (i, j) filter coefficient. The encoder performs the optimization to find the best k(i, j).

In the JVET-N0242 implementation, the clipping parameters k(i, j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left( \left( (M)^{\frac{1}{N}} \right)^{N-n+1} \right) \text{for } n \in 1 .. N] \right\}, \text{with } M = 2^{10} \text{ and } N = 4. \quad (15)$$

Similarly, the Chroma tables of clipping values is obtained according to the following formula:

$$AlfClip_C = \left\{ \text{round}\left( A \cdot \left( \left( \frac{M}{A} \right)^{\frac{1}{N-1}} \right)^{N-n} \right) \text{for } n \in 1 .. N] \right\}, \text{with } M = 2^{10}, N = 4 \text{ and } A = 4. \quad (16)$$

TABLE 5

| Authorized clipping values | |
|---|---|
| | INTRA/INTER tile group |
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

Convolutional neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, and natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications: end-to-end compression purely based on neural networks and traditional frameworks enhanced by neural networks. End-to-end compression purely based on neural networks are discussed in Johannes Balld, Valero Laparra, and Eero P. Simoncelli, "End-to-end optimization of nonlinear transform codes for perceptual quality," 2016 Picture Coding Symposium (PCS), pp. 1-5, Institute of Electrical and Electronics Engineers (IEEE), and Lucas Theis, Wenzhe Shi, Andrew Cunningham, and Ferenc HuszAr, "Lossy image compression with compressive autoencoders," arXiv preprint arXiv:1703.00395 (2017). Traditional frameworks enhanced by neural networks are discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

End-to-end compression usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type of compression take neural networks as an auxiliary, and enhance traditional compression frameworks by replacing or enhancing some modules. In this way, they can inherit the merits of the highly optimized traditional frameworks. For example, a fully connected network for the intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g., HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1, 1) for the height and the width movement.

Figure 12A:
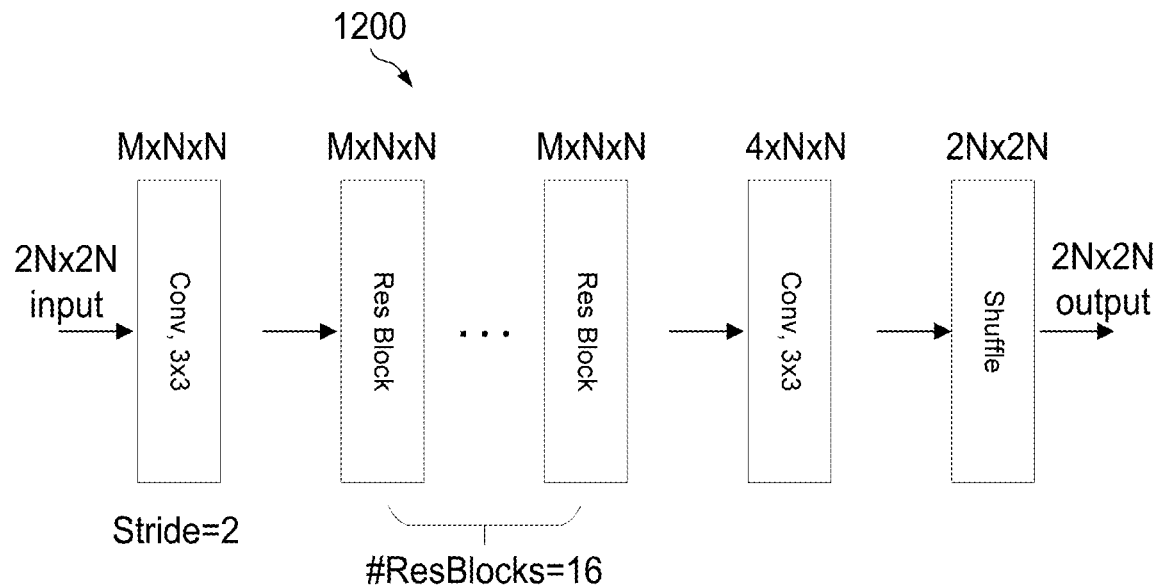
FIG. 12A is an example architecture of the proposed convolutional neural network (CNN) filter.
Figure 12B:
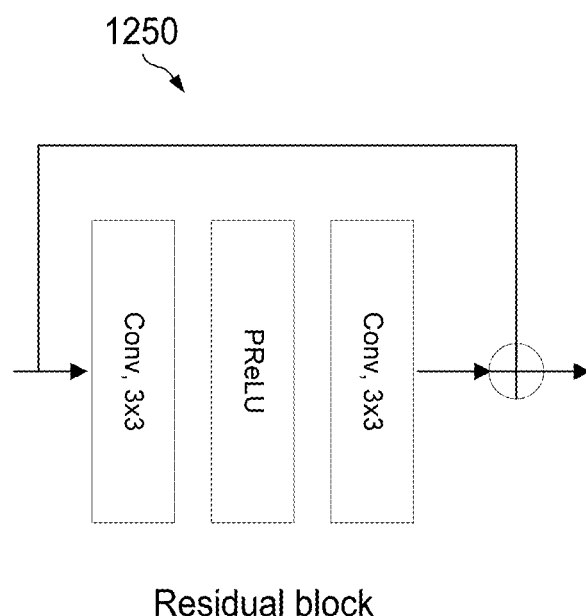
FIG. 12B is an example of construction of a residual block (ResBlock).

FIG. 12A is an example architecture 1200 of the proposed CNN filter, and FIG. 12B is an example of construction 1250 of a residual block (ResBlock). In most of deep convolutional neural networks, residual blocks are utilized as the basic module and stacked several times to construct the final network wherein in one example, the residual block is obtained by combining a convolutional layer, a ReLU/PReLU activation function, and a convolutional layer as shown in FIG. 12B.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has the following problems. First, the padding size is fixed for different slices of different types (e.g., intra mode slice (I-slice), uni-prediction slice (P-slice), and bi-prediction slice (B-slice)). Second, the padding size is fixed for different temporal layers.

Disclosed herein are techniques that solve one or more of the foregoing problems. For example, the present disclosure provides techniques that determine, in real time, padding dimensions for padding samples to be applied to a video unit for in-loop filtering. Thus, the size of the padding area may be adjusted to accommodate the different slices of different types and/or different temporal layers of a multilayer bitstream. Thus, the video coding process is improved relative to conventional video coding techniques.

The detailed embodiments below should be considered as examples to explain general concepts. These embodiments should not be interpreted in a narrow way. Furthermore, these embodiments can be combined in any manner.

One or more neural network (NN) filter models are trained as part of an in-loop filtering technology or filtering technology used in a post-processing stage for reducing the distortion incurred during compression. Samples with different characteristics are processed by different NN filter models. The present disclosure elaborates how to decide the padding size for different video units to achieve better performance, and how to process samples located at video unit boundaries.

In the disclosure, a NN filter can be any kind of NN filter, such as a convolutional neural network (CNN) filter. In the following discussion, an NN filter may also be referred to as a non-CNN filter, e.g., a filter using machine learning based solutions.

In the following discussion, a video unit may be a sequence of pictures, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), a sub-region within a picture/slice/tile/brick. A father video unit (a.k.a., a parent video unit) represents a unit larger than the video unit. Typically, a father video unit will contain several video units, for example, when the video unit is CTU, the father video unit could be a slice, CTU row, multiple CTUs, etc. In some embodiments, the video unit may be a sample/pixel.

Figure 13:
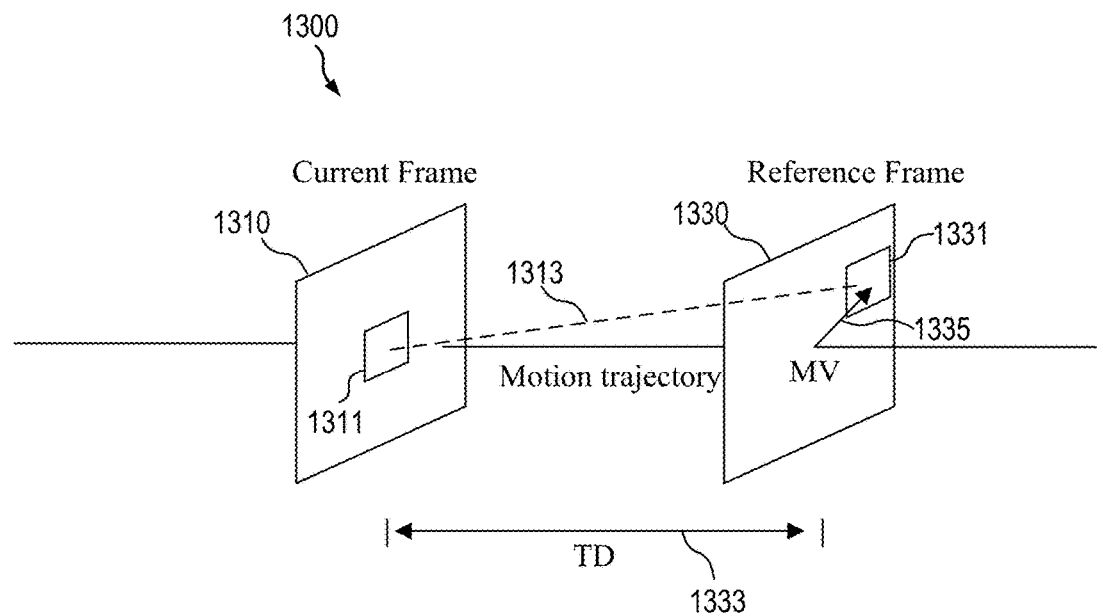
FIG. 13 is a schematic diagram illustrating an example of unidirectional inter prediction.

FIG. 13 is a schematic diagram illustrating an example of unidirectional inter prediction 1300. Unidirectional inter prediction 1300 can be employed to determine motion vectors for encoded and/or decoded blocks created when partitioning a picture.

Unidirectional inter prediction 1300 employs a reference frame 1330 with a reference block 1331 to predict a current block 1311 in a current frame 1310. The reference frame 1330 may be temporally positioned after the current frame 1310 as shown (e.g., as a subsequent reference frame), but may also be temporally positioned before the current frame 1310 (e.g., as a preceding reference frame) in some examples. The current frame 1310 is an example frame/picture being encoded/decoded at a particular time. The current frame 1310 contains an object in the current block 1311 that matches an object in the reference block 1331 of the reference frame 1330. The reference frame 1330 is a frame that is employed as a reference for encoding a current frame 1310, and a reference block 1331 is a block in the reference frame 1330 that contains an object also contained in the current block 1311 of the current frame 1310.

The current block 1311 is any coding unit that is being encoded/decoded at a specified point in the coding process. The current block 1311 may be an entire partitioned block, or may be a sub-block when employing affine inter prediction mode. The current frame 1310 is separated from the reference frame 1330 by some temporal distance (TD) 1333. The TD 1333 indicates an amount of time between the current frame 1310 and the reference frame 1330 in a video sequence, and may be measured in units of frames. The prediction information for the current block 1311 may reference the reference frame 1330 and/or reference block 1331 by a reference index indicating the direction and temporal distance between the frames. Over the time period represented by the TD 1333, the object in the current block 1311 moves from a position in the current frame 1310 to another position in the reference frame 1330 (e.g., the position of the reference block 1331). For example, the object may move along a motion trajectory 1313, which is a direction of movement of an object over time. A motion vector 1335 describes the direction and magnitude of the movement of the object along the motion trajectory 1313 over the TD 1333. Accordingly, an encoded motion vector 1335, a reference block 1331, and a residual including the difference between the current block 1311 and the reference block 1331 provides information sufficient to reconstruct a current block 1311 and position the current block 1311 in the current frame 1310.

Figure 14:
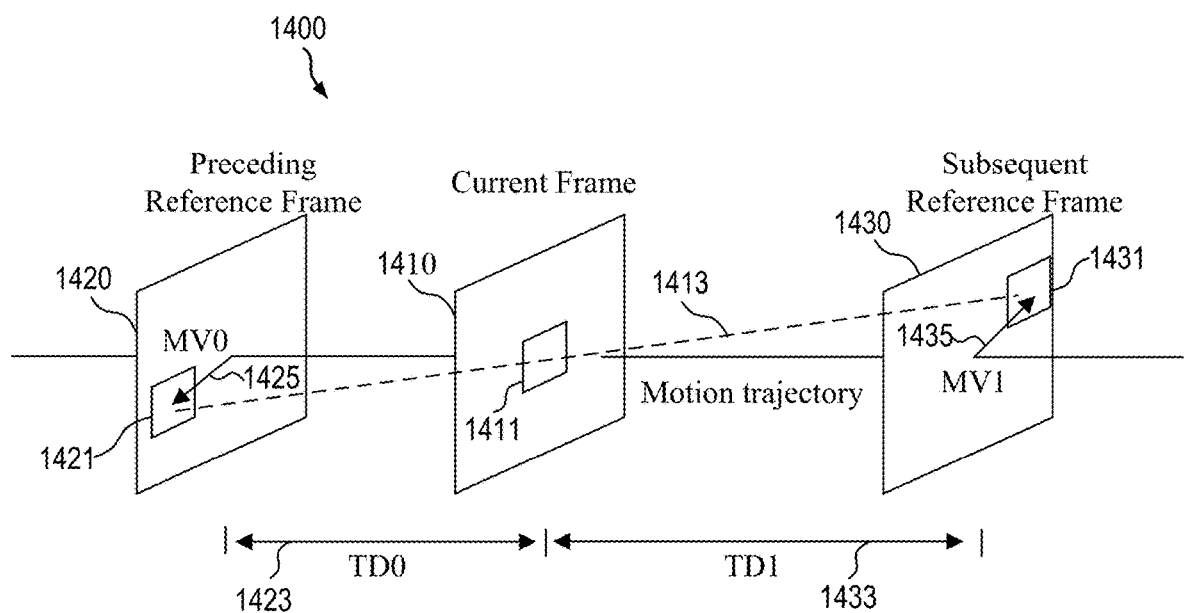
FIG. 14 is a schematic diagram illustrating an example of bidirectional inter prediction.

FIG. 14 is a schematic diagram illustrating an example of bidirectional inter prediction 1400. Bidirectional inter prediction 1400 can be employed to determine motion vectors for encoded and/or decoded blocks created when partitioning a picture.

Bidirectional inter prediction 1400 is similar to unidirectional inter prediction 1300, but employs a pair of reference frames to predict a current block 1411 in a current frame 1410. Hence current frame 1410 and current block 1411 are substantially similar to current frame 1310 and current block 1311, respectively. The current frame 1410 is temporally positioned between a preceding reference frame 1420, which occurs before the current frame 1410 in the video sequence, and a subsequent reference frame 1430, which occurs after the current frame 1410 in the video sequence. Preceding reference frame 1420 and subsequent reference frame 1430 are otherwise substantially similar to reference frame 1330.

The current block 1411 is matched to a preceding reference block 1421 in the preceding reference frame 1420 and to a subsequent reference block 1431 in the subsequent reference frame 1430. Such a match indicates that, over the course of the video sequence, an object moves from a position at the preceding reference block 1421 to a position at the subsequent reference block 1431 along a motion trajectory 1413 and via the current block 1411. The current frame 1410 is separated from the preceding reference frame 1420 by some preceding temporal distance (TD0) 1423 and separated from the subsequent reference frame 1430 by some subsequent temporal distance (TD1) 1433. The TD0 1423 indicates an amount of time between the preceding reference frame 1420 and the current frame 1410 in the video sequence in units of frames. The TD1 1433 indicates an amount of time between the current frame 1410 and the subsequent reference frame 1430 in the video sequence in units of frames. Hence, the object moves from the preceding reference block 1421 to the current block 1411 along the motion trajectory 1413 over a time period indicated by TD0 1423. The object also moves from the current block 1411 to the subsequent reference block 1431 along the motion trajectory 1413 over a time period indicated by TD1 1433. The prediction information for the current block 1411 may reference the preceding reference frame 1420 and/or preceding reference block 1421 and the subsequent reference frame 1430 and/or subsequent reference block 1431 by a pair of reference indices indicating the direction and temporal distance between the frames.

A preceding motion vector (MV0) 1425 describes the direction and magnitude of the movement of the object along the motion trajectory 1413 over the TD0 1423 (e.g., between the preceding reference frame 1420 and the current frame 1410). A subsequent motion vector (MV1) 1435 describes the direction and magnitude of the movement of the object along the motion trajectory 1413 over the TD1 1433 (e.g., between the current frame 1410 and the subsequent reference frame 1430). As such, in bidirectional inter prediction 1400, the current block 1411 can be coded and reconstructed by employing the preceding reference block 1421 and/or the subsequent reference block 1431, MV0 1425, and MV1 1435.

In an embodiment, inter prediction and/or bi-directional inter prediction may be carried out on a sample-by-sample (e.g., pixel-by-pixel) basis instead of on a block-by-block basis. That is, a motion vector pointing to each sample in the preceding reference block 1421 and/or the subsequent reference block 1431 can be determined for each sample in the current block 1411. In such embodiments, the preceding motion vector 1425 and the subsequent motion vector 1435 depicted in FIG. 14 represent a plurality of motion vectors corresponding to the plurality of samples in the current block 1411, the preceding reference block 1421, and the subsequent reference block 1431.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 1300, bidirectional inter prediction 1400, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 1300 and/or bidirectional inter prediction 1400, depending on which approach is used when such neighboring blocks are encoded.

A slice is an integer number of complete tiles or an integer number of consecutive complete coding tree unit (CTU) rows within a tile of a picture that are exclusively contained in a single network abstraction layer (NAL) unit. When the slice contains one or more video units generated using intra prediction, the slice may be referred to as an I-slice or an I-slice type. When the slice contains one or more video units generated using unidirectional inter prediction as shown in FIG. 13, the slice may be referred to as a P-slice or a P-slice type. When the slice contains one or more video units generated using bidirectional inter prediction as shown in FIG. 14, the slice may be referred to as an B-slice or a B-slice type.

Figure 15:
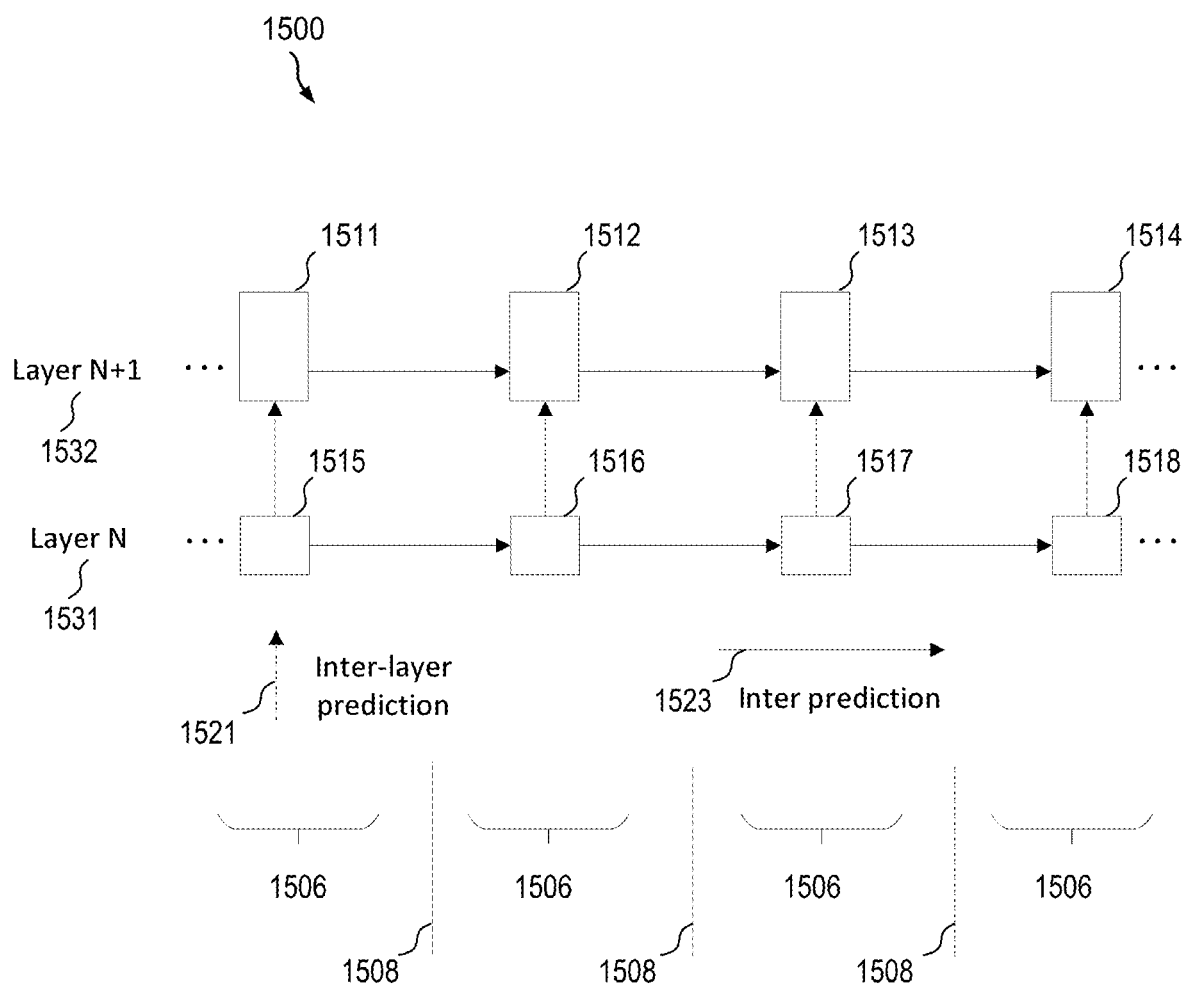
FIG. 15 is a schematic diagram illustrating an example of layer based prediction.

FIG. 15 is a schematic diagram illustrating an example of layer based prediction 1500. Layer based prediction 1500 is compatible with unidirectional inter-prediction and/or bidirectional inter-prediction, but is also performed between pictures in different layers.

Layer based prediction 1500 is applied between pictures 1511, 1512, 1513, and 1514 and pictures 1515, 1516, 1517, and 1518 in different layers (a.k.a., temporal layers). In the example shown, pictures 1511, 1512, 1513, and 1514 are part of layer N+1 1532 and pictures 1515, 1516, 1517, and 1518 are part of layer N 1531. A layer, such as layer N 1531 and/or layer N+1 1532, is a group of pictures that are all associated with a similar value of a characteristic, such as a similar size, quality, resolution, signal to noise ratio, capability, etc. In the example shown, layer N+1 1532 is associated with a larger image size than layer N 1531. Accordingly, pictures 1511, 1512, 1513, and 1514 in layer N+1 1532 have a larger picture size (e.g., larger height and width and hence more samples) than pictures 1515, 1516, 1517, and 1518 in layer N 1531 in this example. However, such pictures can be separated between layer N+1 1532 and layer N 1531 by other characteristics. While only two layers, layer N+1 1532 and layer N 1531, are shown, a set of pictures can be separated into any number of layers based on associated characteristics. Layer N+1 1532 and layer N 1531 may also be denoted by a layer identifier (ID). A layer ID is an item of data that is associated with a picture and denotes the picture is part of an indicated layer. Accordingly, each picture 1511-1518 may be associated with a corresponding layer identifier (ID) to indicate which layer N+1 1532 or layer N 1531 includes the corresponding picture.

Pictures 1511-1518 in different layers 1531-1532 are configured to be displayed in the alternative. As such, pictures 1511-1518 in different layers 1531-1532 can share the same temporal ID and can be included in the same access unit (AU) 1506. As used herein, an AU is a set of one or more coded pictures associated with the same display time for output from a decoded picture buffer (DPB). For example, a decoder may decode and display picture 1515 at a current display time if a smaller picture is desired or the decoder may decode and display picture 1511 at the current display time if a larger picture is desired. As such, pictures 1511-1514 at higher layer N+1 1532 contain substantially the same image data as corresponding pictures 1515-1518 at lower layer N 1531 (notwithstanding the difference in picture size). Specifically, picture 1511 contains substantially the same image data as picture 1515, picture 1512 contains substantially the same image data as picture 1516, etc.

Pictures 1511-1518 can be coded by reference to other pictures 1511-1518 in the same layer N 1531 or layer N+1 1532. Coding a picture in reference to another picture in the same layer results in inter-prediction 1523, which is compatible unidirectional inter-prediction and/or bidirectional inter-prediction. Inter-prediction 1523 is depicted by solid line arrows. For example, picture 1513 may be coded by employing inter-prediction 1523 using one or two of pictures 1511, 1512, and/or 1514 in layer N+1 1532 as a reference, where one picture is referenced for unidirectional inter-prediction and/or two pictures are referenced for bidirectional inter-prediction. Further, picture 1517 may be coded by employing inter-prediction 1523 using one or two of pictures 1515, 1516, and/or 1518 in layer N 1531 as a reference, where one picture is referenced for unidirectional inter-prediction and/or two pictures are referenced for bidirectional inter-prediction. When a picture is used as a reference for another picture in the same layer when performing inter-prediction 1523, the picture may be referred to as a reference picture. For example, picture 1512 may be a reference picture used to code picture 1513 according to inter-prediction 1523. Inter-prediction 1523 can also be referred to as intra-layer prediction in a multi-layer context. As such, inter-prediction 1523 is a mechanism of coding samples of a current picture by reference to indicated samples in a reference picture that are different from the current picture where the reference picture and the current picture are in the same layer.

Pictures 1511-1518 can also be coded by reference to other pictures 1511-1518 in different layers. This process is known as inter-layer prediction 1521, and is depicted by dashed arrows. Inter-layer prediction 1521 is a mechanism of coding samples of a current picture by reference to indicated samples in a reference picture where the current picture and the reference picture are in different layers and hence have different layer IDs. For example, a picture in a lower layer N 1531 can be used as a reference picture to code a corresponding picture at a higher layer N+1 1532. As a specific example, picture 1511 can be coded by reference to picture 1515 according to inter-layer prediction 1521. In such a case, the picture 1515 is used as an inter-layer reference picture. An inter-layer reference picture is a reference picture used for inter-layer prediction 1521. In most cases, inter-layer prediction 1521 is constrained such that a current picture, such as picture 1511, can only use inter-layer reference picture(s) that are included in the same AU 1506 and that are at a lower layer, such as picture 1515. When multiple layers (e.g., more than two) are available, inter-layer prediction 1521 can encode/decode a current picture based on multiple inter-layer reference picture(s) at lower levels than the current picture.

A video encoder can employ layer based prediction 1500 to encode pictures 1511-1518 via many different combinations and/or permutations of inter-prediction 1523 and inter-layer prediction 1521. For example, picture 1515 may be coded according to intra-prediction. Pictures 1516-1518 can then be coded according to inter-prediction 1523 by using picture 1515 as a reference picture. Further, picture 1511 may be coded according to inter-layer prediction 1521 by using picture 1515 as an inter-layer reference picture. Pictures 1512-1514 can then be coded according to inter-prediction 1523 by using picture 1511 as a reference picture. As such, a reference picture can serve as both a single layer reference picture and an inter-layer reference picture for different coding mechanisms. By coding higher layer N+1 1532 pictures based on lower layer N 1531 pictures, the higher layer N+1 1532 can avoid employing intra-prediction, which has much lower coding efficiency than inter-prediction 1523 and inter-layer prediction 1521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 1506 in FIG. 15 may contain several pictures. For example, one AU 1506 may contain pictures 1511 and 1515. Another AU 1506 may contain pictures 1512 and 1516. Indeed, each AU 1506 is a set of one or more coded pictures associated with the same display time (e.g., the same temporal ID) for output from a decoded picture buffer (DPB)(e.g., for display to a user). Each access unit delimiter (AUD) 1508 is an indicator or data structure used to indicate the start of an AU (e.g., AU 1506) or the boundary between AUs.

Previous H.26x video coding families have provided support for scalability in a separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in enhancement layer (EL) pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides support for three-dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same AU and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Duplicate or repetitive padding may be used to expand a picture to a bigger size. More specifically, reference pictures (e.g., reference frame 1330 in FIG. 13, or preceding reference frame 1420 or subsequent reference frame 1430 in FIG. 14) are extended to form a bigger picture. For example, boundary samples located at a left boundary of the reference picture are copied to the left of the reference picture, boundary samples located at a right boundary of the reference picture are copied to the right of the reference picture, boundary samples located at a top boundary of the reference picture are copied above the reference picture, and boundary samples located at a bottom boundary of the reference picture are copied below the reference picture. These copied boundary samples located outside the reference picture are referred to as padded samples (a.k.a., padding samples).

For current picture coding, when a motion vector (e.g., MV 1335) of a current block (e.g., current block 1311) points to a reference block (e.g., reference block 1331) which (partially or completely) locates outside the reference picture (e.g., reference frame 1330), the prediction block of the current block is generated from padded samples outside the reference picture boundary.

Motion compensated boundary padding is discussed in "Description of SDR HDR and 360 video coding technology proposal by Qualcomm and Technicolor-low and high complexity versions" by Y. W. Chen, et al., JEVT document JVET-J0021, 2018. When a decoder performs motion compensation, if the motion vector points to a block outside the reference frame boundary, a part of the reference block is unavailable. To remedy that issue, the reference picture/frame may be expanded or enlarged using padded samples.

For each region with a size of 4×M or M×4 along the boundary of the reference picture to be padded, M being the desired frame boundary extension, a motion vector is derived from the nearest 4×4 block inside the frame. If the nearest 4×4 block is intra coded, a zero motion vector is used. If the nearest 4×4 block is coded with bi-directional inter prediction, only the motion vector, which points to the pixel farther away from the frame boundary, is used in motion compensation for padding. After the motion vector derivation, motion compensation is then performed to obtain the pixels in the padding region with the consideration of average pixel value offset between the nearest 4×4 block and its corresponding block in its reference picture.

A discussion of padding size is provided.

Example 1

Figures 16, 17:
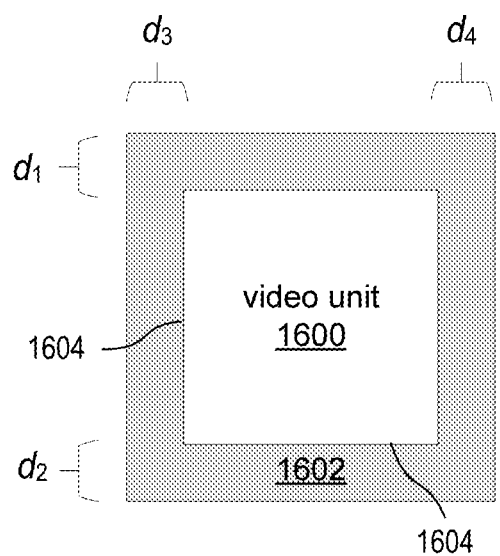
FIG. 16 illustrates a padded video unit where $d_1$, $d_2$, $d_3$, $d_4$ are the padding dimensions for the top, bottom, left, and right boundaries, respectively.
FIG. 17 illustrates mirror padding where the grey blocks represent padding samples.

1. FIG. 16 illustrates a padded video unit 1600 where $d_1$, $d_2$, $d_3$, $d_4$ are the padding dimensions for the top, bottom, left, and right boundaries 1604, respectively, of the padded video unit 1600. The padding dimensions collectively form the padding area 1602 around the padded video unit 1600. The padding area 1602 includes padding samples used to predict samples within the padded video unit 1600, as described above. Samples within the padded video unit 1600 that abut one or more of the boundaries 1604 of the padded video unit 1600 may be referred to as boundary samples or neighboring samples.

In an embodiment, the padding size-related parameters (e.g., $d_1$, $d_2$, $d_3$, $d_4$) are determined in real time (a.k.a., on-the-fly). Real time (or real-time) describes various operations in computing or other processes that guarantee response times within a specified time (deadline), usually a relatively short time. A real-time process is generally one that happens in defined time steps of maximum duration and fast enough to affect the environment in which the process occurs, such as inputs to a computing system. In an embodiment, real time means that the dimensions are decided and/or implemented during the prediction process.

a. In one example, $d_1$, $d_2$, $d_3$, $d_4$ are different.
 b. In one example, $d_1$, $d_2$, $d_3$, $d_4$ are the same.
 c. In one example, $d_1=d_2$, $d_3=d_4$.
 d. In one example, indications of padding size are signaled in a bitstream. In an embodiment, indications are hints, initial parameters, or other values used to derive the padding size. Padding size refers to the size of the padding area 1602 and/or one or more of the padding dimensions.
 e. In one example, at least one of the padding size related parameters is determined according to the location of a video unit relative to a father video unit.
  i. In one example, at least one of the $d_1$, $d_2$, $d_3$, $d_4$ is different for the video units located at the father video unit boundaries and $d_1$, $d_2$, $d_3$, $d_4$ are the same for the internal video units.
 f. In one example, padding size is dependent on the video unit size.
  i. In one example, the padding size is the same for video units of different block size.
  ii. In one example, larger padding size is used for larger video units.
  iii. In one example, padding size to video unit size ratio is a predefined constant.
 g. In one example, the padding size is dependent on color formats (such as 4:4:4 or 4:2:0) and/or color channel types.
  i. In one example, padding size is the same for different channel types.
  ii. In one example, padding size is set larger for the luma component and smaller for the chroma components.
 h. In one example, the padding size is dependent on slice types and/or partitioning tree types (single tree or dual tree). A partitioning tree is a structure that visually represents the division of a set into subsets such that each element of the set is in exactly one of the subsets. In single tree, the partitioning tree is shared by both luma and chroma components. In dual tree, there may be one partitioning tree for luma components and another partitioning tree for chroma components.
  i. In one example, padding size is the same for slices of different types.
  ii. In one example, padding size is set larger for the intra slice and smaller for the inter slice.
  i. In one example, the padding size is dependent on temporal layers and/or reference picture information.
  i. In one example, padding size is the same for different temporal layers.
  ii. In one example, padding size is set larger for low temporal layers (e.g., layer 1531 in FIG. 15) and smaller for high temporal layers (e.g., layer 1532 in FIG. 15).
 j. In one example, the padding size for a first video unit is dependent on the kind of NN-filtering method applied to the first video unit.
 k. In one example, the padding size is dependent on other decoded information (e.g., characteristics of one video unit such as percentage of intra-coded samples).
 l. In one example, the padding size is dependent on whether the NN filter is applied.
 m. In one example, the padding dimensions $d_1$, $d_2$, $d_3$, $d_4$ are set to be 8 for internal boundaries and 0 for the boundaries located at the father video unit boundaries, respectively. In an embodiment, internal boundaries are the boundaries of child video units within the father video unit and which were created by partitioning the father video unit.
 n. In one example, the video unit is set to be a block (e.g., coding block) whose size is dependent on slice resolutions and quantization parameters (QPs). Resolution may refer to spatial resolution (e.g., the size of a display), temporal resolution (e.g., the frame rate), or video quality (e.g., the number of pixels displayed–1920×1080, etc.).
 o. In one example, the father video unit (a.k.a., parent video unit) is set to be a slice.

A discussion of padding methods is provided.

Example 2

2. Padding methods (e.g., how to generate sample values outside a video unit and/or whether to apply padding or not) could be decided in real time (a.k.a., on-the-fly).
 a. In one example, whether to apply padding may depend on whether at least one or all of the samples outside the video unit are available.
  i. In one example, when all the samples in the padded area are available for all boundaries, e.g. top boundary, bottom boundary, left boundary, and right boundary, those samples are directly used without padding.
  ii. In one example, when at least one of the samples in the padded area is unavailable for all boundaries, all the neighboring samples are padded.
 b. In one example, whether to apply padding may depend on whether at least one or all of the samples outside the video unit along a given direction (e.g., top/bottom/left/right) are available.
  i. In one example, if all the neighboring samples are available for a particular boundary, e.g. top boundary, bottom boundary, left boundary, or right boundary, the neighboring samples are directly used without padding.

ii. In one example, when at least one of the samples in the padded area is unavailable for a particular boundary, all the neighboring samples for that boundary are padded.

c. In one example, available samples in the padded area are directly used without padding and unavailable samples in the padded area may be padded.

d. In one example, the padding method may be one of approaches from zero padding, reflection padding, replication padding, constant padding, and mirror padding. In an embodiment, zero padding occurs when a border of samples (or pixels) all with value zero are added around the edges of the input images. This adds a padding of zeros around the outside of the image, hence the name zero padding. In an embodiment, during reflection padding values are padded with the "reflection" or "mirror" of the values directly in the opposite direction of the edge of the "to be padded" shape (e.g., the video unit). In an embodiment, during replication padding the frame boundary pixels are repeated when the selected reference block is outside or crossing the frame boundary of the reference frame. In an embodiment, the initial image for reconstruction is padded with a uniform intensity border—which is referred to as constant padding. FIG. 17 illustrates mirror padding 1700 where the grey blocks represent padding samples. The numbers inside each block are provided to illustrate a suitable pattern used to implement mirror padding.

i. In one example, to apply mirror padding, values outside the boundary are obtained by mirror-reflecting the video unit across its border as shown in FIG. 17.

e. Padding methods could be dependent on the video unit size.

f. In one example, indications of padding methods are signaled in a bitstream.

g. In one example, at least one of the padding method related parameters (e.g., the padding dimensions) is determined according to the location of a video unit relative to a father video unit.

h. In one example, the padding method for a first video unit is dependent on the kind of NN-filtering method applied on the first video unit.

i. In one example, the padding method is dependent on other decoded information (e.g., characteristics of one video unit such as percentage of intra-coded samples).

j. In one example, the padding method is dependent on whether the NN filter is applied.

k. Padding methods could be dependent on the channel type.

l. Padding methods could be dependent on a slice type.

m. Padding methods could be dependent on a temporal layer.

Example 3

3. In one example, the samples in the padded area are the unfiltered version, i.e., before the NN filter is applied.

Example 4

4. In one example, the samples in the padded area are the filtered version, i.e., after the NN filter is applied.

Interference block size is discussed.

Example 5

5. Granularity of NN filter model selection may be different from the CTU size.

a. The granularity may be pre-defined or indication of the granularity may be signaled in the bitstream or derived on-the-fly.

b. In one example, the granularity is dependent on QP and resolution.

i. In one example, when QP is larger or resolution goes higher, granularity is coarser.

ii. In one example, denote sequence level QP as q and frame width as w. When q<23, granularity is 32×32. When 23≤q<29 and w≤832, granularity is 32×32. When 23≤q<29 and w>832, granularity is 64×64. When q≥29 and w≤832, granularity is 128×128. When q≥29 and w>832, granularity is 256×256.

Binarization of an NN filter model index is discussed.

Example 6

Binarization of NN filter model index of a first video unit such as a coding block or a region could be dependent on the maximum model number allowed at a level higher than the first video unit. Binarization is the process of dividing data into two groups and assigning one out of two values to all the members of the same group. This is usually accomplished by defining a threshold and assigning the value 0 to all the data points below the threshold and 1 to those above the threshold.

a. In one example, the high level is a slice/picture/sequence level.

b. In one example, indication of the maximum model number is signaled at the high level or pre-defined or derived on-the-fly.

i. In one example, indication of the maximum model number is signaled in picture header/slice header/picture parameter set (PPS)/sequence parameter set (SPS)/adaption parameter set (APS).

c. In one example, the NN filter model index may be binarized as a truncated code, such as truncated unary code or truncated binary code. Unary coding is an entropy encoding that represents a natural number, n, with n ones followed by a zero. Truncated unary code is a variant of unary code. Truncated binary, or truncated binary encoding, is an entropy encoding typically used for uniform probability distributions with a finite alphabet.

Figure 18:
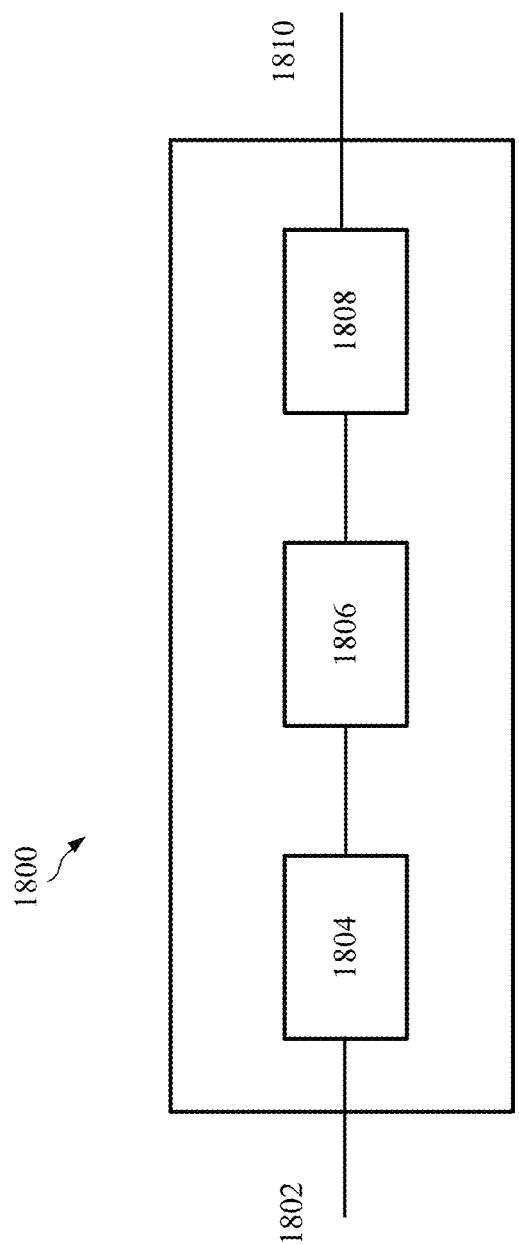
FIG. 18 is a block diagram showing an example video processing system.

FIG. 18 is a block diagram showing an example video processing system 1800 in which various techniques disclosed herein may be implemented. Various implementations may include some or all of the components of the video processing system 1800. The video processing system 1800 may include input 1802 for receiving video content. The video content may be received in a raw or uncompressed format, e.g., 8 or 10 bit multi-component pixel values, or may be in a compressed or encoded format. The input 1802 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1800 may include a coding component 1804 that may implement the various coding or encoding methods described in the present document. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 19:
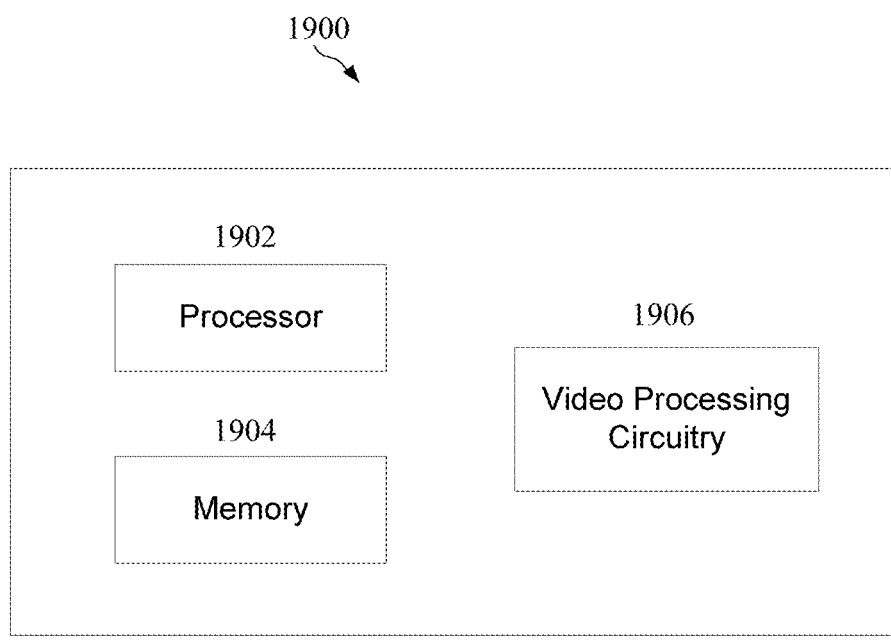
FIG. 19 is a block diagram of a video processing apparatus.

FIG. 19 is a block diagram of a video processing apparatus 1900. The video processing apparatus 1900 may be used to implement one or more of the methods described herein. The video processing apparatus 1900 may be embodied in a smartphone, tablet, computer, Internet of Things (IoT) receiver, and so on. The video processing apparatus 1900 may include one or more processors 1902, one or more memories 1904 and video processing hardware 1906 (a.k.a., video processing circuitry). The processor(s) 1902 may be configured to implement one or more methods described in the present document. The memory (memories) 1904 may be used for storing data and code used for implementing the methods and techniques described herein. The video processing hardware 1906 may be used to implement, in hardware circuitry, some techniques described in the present document. In some embodiments, the video processing hardware 1906 may be partly or completely located within the processor 1902, e.g., a graphics processor.

Figure 20:
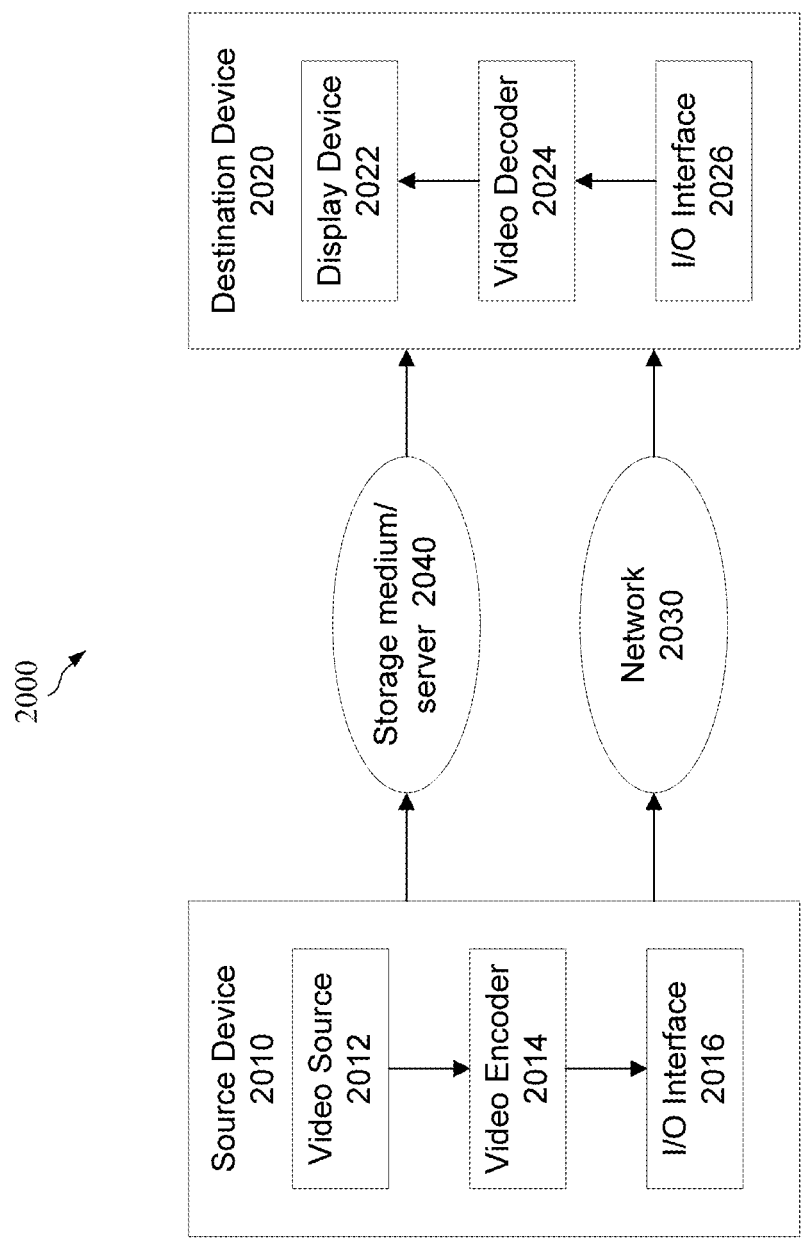
FIG. 20 is a block diagram that illustrates an example of a video coding system.

FIG. 20 is a block diagram that illustrates an example of a video coding system 2000 that may utilize the techniques of this disclosure. As shown in FIG. 20, the video coding system 2000 may include a source device 2010 and a destination device 2020. Source device 2010 generates encoded video data which may be referred to as a video encoding device. Destination device 2020 may decode the encoded video data generated by source device 2010 which may be referred to as a video decoding device.

Source device 2010 may include a video source 2012, a video encoder 2014, and an input/output (I/O) interface 2016.

Video source 2012 may include a source such as a video capture device, an interface to receive video data from a video content provider, and/or a computer graphics system for generating video data, or a combination of such sources. The video data may comprise one or more pictures. Video encoder 2014 encodes the video data from video source 2012 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2016 may include a modulator/demodulator (modem) and/or a transmitter. The encoded video data may be transmitted directly to destination device 2020 via I/O interface 2016 through network 2030. The encoded video data may also be stored onto a storage medium/server 2040 for access by destination device 2020.

Destination device 2020 may include an I/O interface 2026, a video decoder 2024, and a display device 2022.

I/O interface 2026 may include a receiver and/or a modem. I/O interface 2026 may acquire encoded video data from the source device 2010 or the storage medium/server 2040. Video decoder 2024 may decode the encoded video data. Display device 2022 may display the decoded video data to a user. Display device 2022 may be integrated with the destination device 2020, or may be external to destination device 2020 which may be configured to interface with an external display device.

Video encoder 2014 and video decoder 2024 may operate according to a video compression standard, such as the High Efficiency Video Coding (HEVC) standard, Versatile Video Coding (VVC) standard, and other current and/or further standards.

Figure 21:
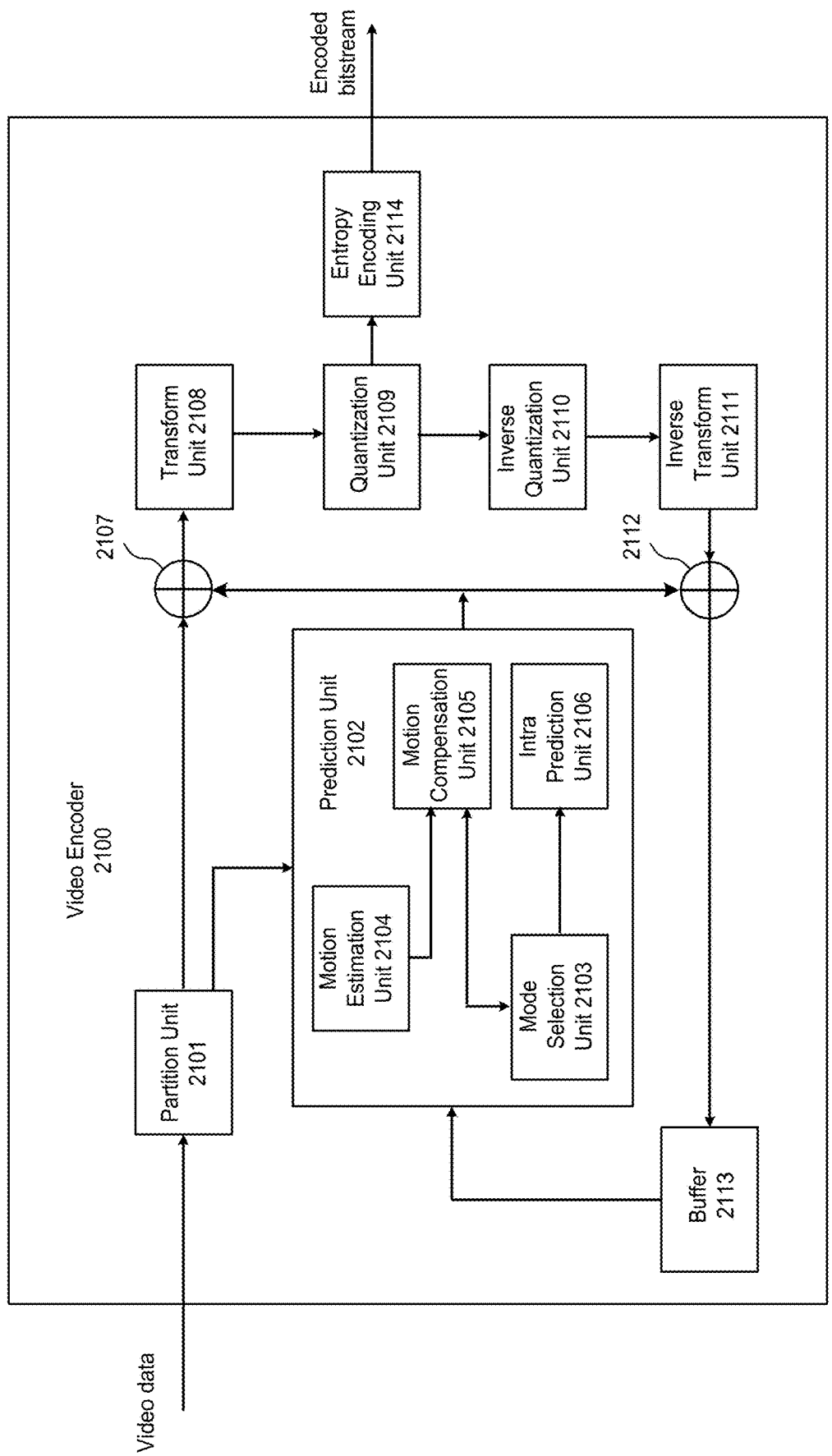
FIG. 21 is a block diagram illustrating an example of a video encoder.

FIG. 21 is a block diagram illustrating an example of a video encoder 2100, which may be video encoder 2014 in the video coding system 2000 illustrated in FIG. 20.

Video encoder 2100 may be configured to perform any or all of the techniques of this disclosure. In the example of FIG. 21, video encoder 2100 includes a plurality of functional components. The techniques described in this disclosure may be shared among the various components of video encoder 2100. In some examples, a processor may be configured to perform any or all of the techniques described in this disclosure.

The functional components of video encoder 2100 may include a partition unit 2101, a prediction unit 2102 which may include a mode selection unit 2103, a motion estimation unit 2104, a motion compensation unit 2105 and an intra prediction unit 2106, a residual generation unit 2107, a transform unit 2108, a quantization unit 2109, an inverse quantization unit 2110, an inverse transform unit 2111, a reconstruction unit 2112, a buffer 2113, and an entropy encoding unit 2114.

In other examples, video encoder 2100 may include more, fewer, or different functional components. In an example, prediction unit 2102 may include an intra block copy (IBC) unit. The IBC unit may perform prediction in an IBC mode in which at least one reference picture is a picture where the current video block is located.

Furthermore, some components, such as motion estimation unit 2104 and motion compensation unit 2105 may be highly integrated, but are represented in the example of FIG. 21 separately for purposes of explanation.

Partition unit 2101 may partition a picture into one or more video blocks. Video encoder 2014 and video decoder 2024 of FIG. 20 may support various video block sizes.

Mode selection unit 2103 may select one of the coding modes, intra or inter, e.g., based on error results, and provide the resulting intra- or inter-coded block to a residual generation unit 2107 to generate residual block data and to a reconstruction unit 2112 to reconstruct the encoded block for use as a reference picture. In some examples, mode selection unit 2103 may select a combination of intra and inter prediction (CIIP) mode in which the prediction is based on an inter prediction signal and an intra prediction signal. Mode selection unit 2103 may also select a resolution for a motion vector (e.g., a sub-pixel or integer pixel precision) for the block in the case of inter-prediction.

To perform inter prediction on a current video block, motion estimation unit 2104 may generate motion information for the current video block by comparing one or more reference frames from buffer 2113 to the current video block. Motion compensation unit 2105 may determine a predicted video block for the current video block based on the motion information and decoded samples of pictures from buffer 2113 other than the picture associated with the current video block.

Motion estimation unit 2104 and motion compensation unit 2105 may perform different operations for a current video block, for example, depending on whether the current video block is an I slice, a P slice, or a B slice. I-slices (or I-frames) are the least compressible but don't require other video frames to decode. P-slices (or P-frames) can use data from previous frames to decompress and are more compressible than I-frames. B-slices (or B-frames) can use both previous and forward frames for data reference to get the highest amount of data compression.

In some examples, motion estimation unit 2104 may perform uni-directional prediction for the current video block, and motion estimation unit 2104 may search reference pictures of list 0 or list 1 for a reference video block for the current video block. Motion estimation unit 2104 may then generate a reference index that indicates the reference picture in list 0 or list 1 that contains the reference video block and a motion vector that indicates a spatial displacement between the current video block and the reference video block. Motion estimation unit 2104 may output the reference index, a prediction direction indicator, and the motion vector as the motion information of the current video block. Motion compensation unit 2105 may generate the predicted video block of the current block based on the reference video block indicated by the motion information of the current video block.

In other examples, motion estimation unit 2104 may perform bi-directional prediction for the current video block, motion estimation unit 2104 may search the reference pictures in list 0 for a reference video block for the current video block and may also search the reference pictures in list 1 for another reference video block for the current video block. Motion estimation unit 2104 may then generate reference indexes that indicate the reference pictures in list 0 and list 1 containing the reference video blocks and motion vectors that indicate spatial displacements between the reference video blocks and the current video block. Motion estimation unit 2104 may output the reference indexes and the motion vectors of the current video block as the motion information of the current video block. Motion compensation unit 2105 may generate the predicted video block of the current video block based on the reference video blocks indicated by the motion information of the current video block.

In some examples, motion estimation unit 2104 may output a full set of motion information for decoding processing of a decoder.

In some examples, motion estimation unit 2104 may not output a full set of motion information for the current video. Rather, motion estimation unit 2104 may signal the motion information of the current video block with reference to the motion information of another video block. For example, motion estimation unit 2104 may determine that the motion information of the current video block is sufficiently similar to the motion information of a neighboring video block.

In one example, motion estimation unit 2104 may indicate, in a syntax structure associated with the current video block, a value that indicates to the video decoder 2024 that the current video block has the same motion information as another video block.

In another example, motion estimation unit 2104 may identify, in a syntax structure associated with the current video block, another video block and a motion vector difference (MVD). The motion vector difference indicates a difference between the motion vector of the current video block and the motion vector of the indicated video block. The video decoder 2024 may use the motion vector of the indicated video block and the motion vector difference to determine the motion vector of the current video block.

As discussed above, video encoder 2014 may predictively signal the motion vector. Two examples of predictive signaling techniques that may be implemented by video encoder 2014 include advanced motion vector prediction (AMVP) and merge mode signaling.

Intra prediction unit 2106 may perform intra prediction on the current video block. When intra prediction unit 2106 performs intra prediction on the current video block, intra prediction unit 2106 may generate prediction data for the current video block based on decoded samples of other video blocks in the same picture. The prediction data for the current video block may include a predicted video block and various syntax elements.

Residual generation unit 2107 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 2107 may not perform the subtracting operation.

Transform unit 2108 may generate one or more transform coefficient video blocks for the current video block by applying one or more transforms to a residual video block associated with the current video block.

After transform unit 2108 generates a transform coefficient video block associated with the current video block, quantization unit 2109 may quantize the transform coefficient video block associated with the current video block based on one or more quantization parameter (QP) values associated with the current video block.

Inverse quantization unit 2110 and inverse transform unit 2111 may apply inverse quantization and inverse transforms to the transform coefficient video block, respectively, to reconstruct a residual video block from the transform coefficient video block. Reconstruction unit 2112 may add the reconstructed residual video block to corresponding samples from one or more predicted video blocks generated by the prediction unit 2102 to produce a reconstructed video block associated with the current block for storage in the buffer 2113.

After reconstruction unit 2112 reconstructs the video block, loop filtering operation may be performed to reduce video blocking artifacts in the video block.

Entropy encoding unit 2114 may receive data from other functional components of the video encoder 2100. When entropy encoding unit 2114 receives the data, entropy encoding unit 2114 may perform one or more entropy encoding operations to generate entropy encoded data and output a bitstream that includes the entropy encoded data.

Figure 22:
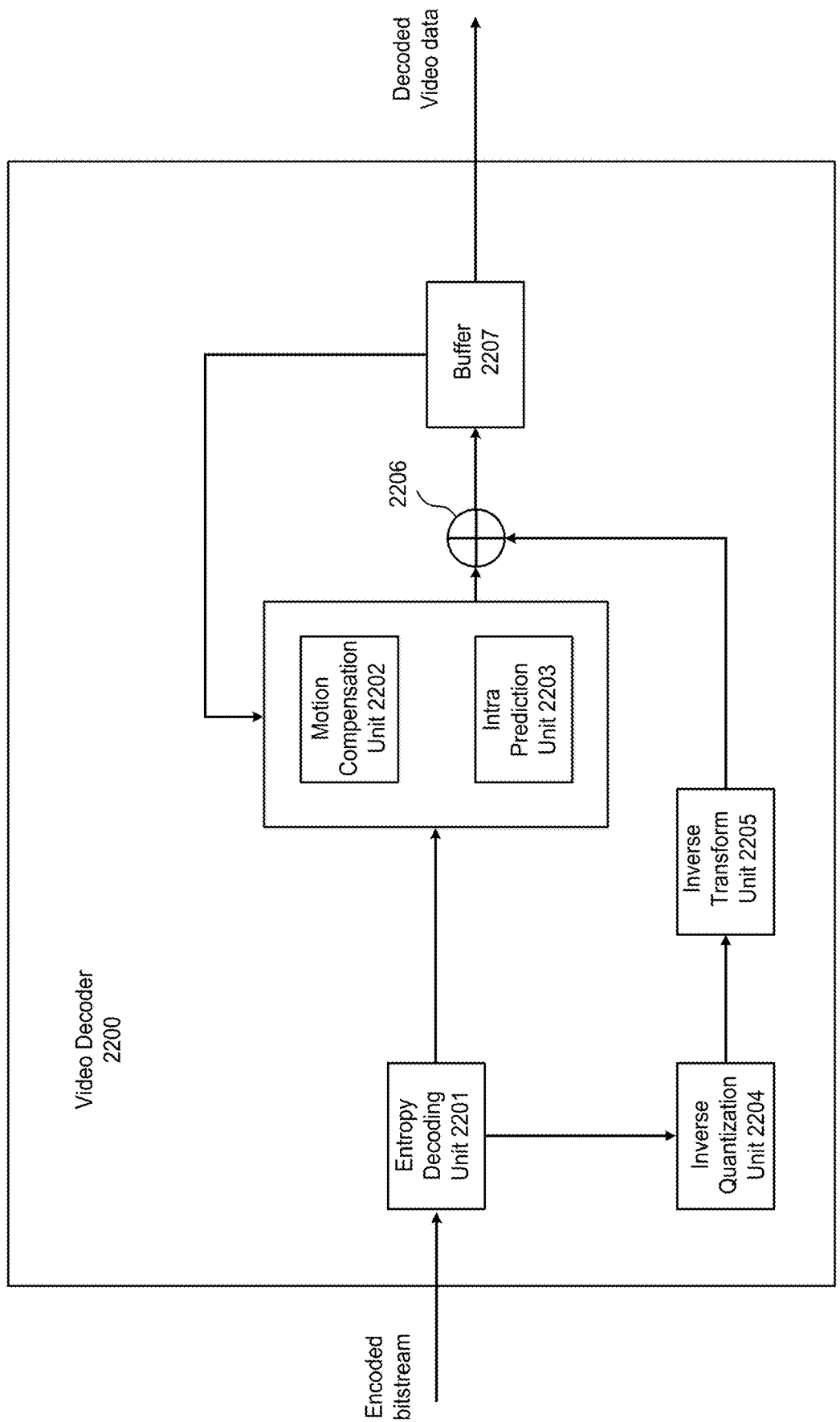
FIG. 22 is a block diagram illustrating an example of a video decoder.

FIG. 22 is a block diagram illustrating an example of a video decoder 2200, which may be video decoder 2024 in the video coding system 2000 illustrated in FIG. 20.

The video decoder 2200 may be configured to perform any or all of the techniques of this disclosure. In the example of FIG. 22, the video decoder 2200 includes a plurality of functional components. The techniques described in this disclosure may be shared among the various components of the video decoder 2200. In some examples, a processor may be configured to perform any or all of the techniques described in this disclosure.

In the example of FIG. 22, video decoder 2200 includes an entropy decoding unit 2201, a motion compensation unit 2202, an intra prediction unit 2203, an inverse quantization unit 2204, an inverse transformation unit 2205, a reconstruction unit 2206 and a buffer 2207. Video decoder 2200 may, in some examples, perform a decoding pass generally reciprocal to the encoding pass described with respect to video encoder 2014 (FIG. 20).

Entropy decoding unit 2201 may retrieve an encoded bitstream. The encoded bitstream may include entropy coded video data (e.g., encoded blocks of video data). Entropy decoding unit 2201 may decode the entropy coded video data, and from the entropy decoded video data, motion compensation unit 2202 may determine motion information including motion vectors, motion vector precision, reference picture list indexes, and other motion information. Motion compensation unit 2202 may, for example, determine such information by performing the AMVP and merge mode signaling.

Motion compensation unit 2202 may produce motion compensated blocks, possibly performing interpolation based on interpolation filters. Identifiers for interpolation filters to be used with sub-pixel precision may be included in the syntax elements.

Motion compensation unit 2202 may use interpolation filters as used by video encoder 2014 during encoding of the video block to calculate interpolated values for sub-integer pixels of a reference block. Motion compensation unit 2202 may determine the interpolation filters used by video encoder 2014 according to received syntax information and use the interpolation filters to produce predictive blocks.

Motion compensation unit 2202 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2203 may use intra prediction modes for example received in the bitstream to form a prediction block from spatially adjacent blocks. Inverse quantization unit 2204 inverse quantizes, i.e., de-quantizes, the quantized video block coefficients provided in the bitstream and decoded by entropy decoding unit 2201. Inverse transform unit 2205 applies an inverse transform.

Reconstruction unit 2206 may sum the residual blocks with the corresponding prediction blocks generated by motion compensation unit 2202 or intra-prediction unit 2203 to form decoded blocks. If desired, a deblocking filter may also be applied to filter the decoded blocks in order to remove blockiness artifacts. The decoded video blocks are then stored in buffer 2207, which provides reference blocks for subsequent motion compensation/intra prediction and also produces decoded video for presentation on a display device.

Figure 23:
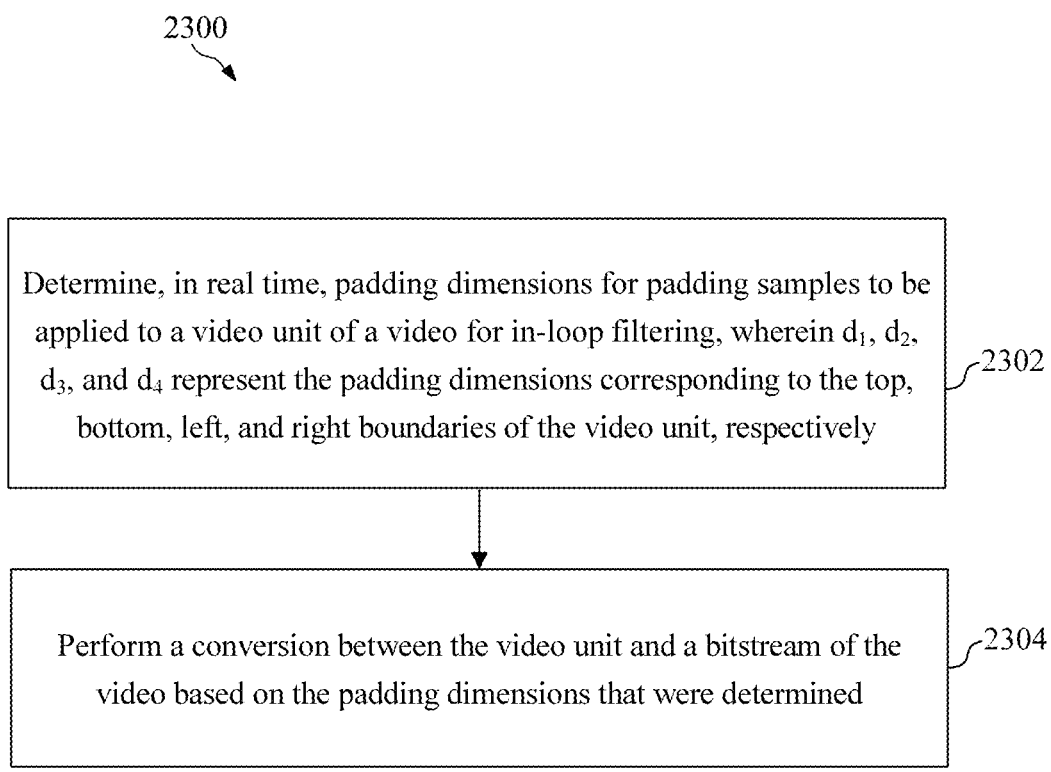
FIG. 23 is a method for coding video data according to an embodiment of the disclosure.

FIG. 23 is a method 2300 for coding video data according to an embodiment of the disclosure. The method 2300 may be performed by a coding apparatus (e.g., an encoder) having a processor and a memory. The method 2300 may be implemented when padding dimensions for padding samples to be applied to a video unit during in-loop filtering need to be determined.

In block 2302, the coding apparatus determines, in real time, padding dimensions for padding samples to be applied to a video unit of a video for in-loop filtering. In an embodiment, $d_1$, $d_2$, $d_3$, and $d_4$ represent the padding dimensions corresponding to the top, bottom, left, and right boundaries of the video unit, respectively.

In block 2304, the coding apparatus performs a conversion between the video unit and a bitstream of the video based on the filtered sample that was generated. When implemented in an encoder, converting includes receiving a media file (e.g., a video unit) and encoding the media file into a bitstream. When implemented in a decoder, converting includes receiving a bitstream including the media file, and decoding the bitstream to obtain the media file.

In an embodiment, the method 2300 may utilize or incorporate one or more of the features or processes of the other methods disclosed herein.

A listing of solutions preferred by some embodiments is provided next.

The following solutions show example embodiments of techniques discussed in the present disclosure (e.g., Example 1).

1. A method of video processing, comprising: determining, for a conversion between a video block of a video and a bitstream of the video, padding sizes around the video block for applying an in-loop filtering to the video block according to a rule; and performing the conversion based on the determining, wherein the sizes defined by $d_1$, $d_2$, $d_3$, and $d_4$ are the padding size for a top, a bottom, a left, and a right boundary, respectively.

2. The method of claim 1, wherein the rule specifies that $d_1$, $d_2$, $d_3$, $d_4$ are different from each other.

3. A method of video processing, comprising: determining, for a conversion between a video block of a video and a bitstream of the video, whether or how to generate padding samples outside the video block for applying an in-loop filtering to the video block according to a rule; and performing the conversion based on the determining.

4. The method of claim 3, wherein the rule specifies that whether to generate the padding samples is dependent on whether one or all of the samples outside the video unit are available.

5. The method of claim 3, wherein the rule specifies that whether to generate the padding samples is dependent on whether one or all of the samples outside the video unit along a given direction are available.

6. The method of any of claims 3-5, wherein the rule specified that available samples outside the video block are used without padding and unavailable samples outside the video block are padded prior to the applying the in-loop filtering.

7. The method of any of claims 3-6, wherein the padding samples are samples prior to application of a neural network (NN) filter.

8. The method of any of claims 3-7, wherein the padding samples are samples after application of a neural network (NN) filter.

9. A method of video processing, comprising: determining, for a conversion between a video comprising a video picture comprising a video block and a bitstream representation of the picture, a granularity of a neural network (NN) filter model used for in-loop filtering during the conversion based on a rule, and performing the conversion based on the determining, wherein the rule defines the granularity of the NN filter model independent of a size of the video block.

10. The method of claim 9, wherein the rule defines that the granularity is pre-defined.

11. The method of any of claims 9-10, wherein the rule defines that the granularity is dependent on a quantization parameter (QP) or a frame resolution.

12. A method of video processing, comprising: performing a conversion between a video comprising a video region comprising a video unit and a bitstream of the video, wherein the conversion includes applying an in-loop neural network (NN) filter to the first video unit according to a rule, wherein the rule specifies that a binarization of an index to a model number of the NN filter according to a maximum number of models is allowed at a level of the video region.

13. The method of claim 12, wherein the video region is a slice or a picture or a sequence.

14. The method of any of claims 12-13, wherein the maximum number of models allowed at the level of the video region is pre-determined or determined during the conversion.

15. The method of any of claims 12-13, wherein the binarization of the index uses a truncated code.

16. The method of any of claims 1-15, wherein the conversion comprises generating the bitstream from the video.

17. The method of any of claims 1-15, wherein the conversion comprises generating the video from the bitstream.

18. A video decoding apparatus comprising a processor configured to implement a method recited in one or more of claims 1 to 17.

19. A video encoding apparatus comprising a processor configured to implement a method recited in one or more of claims 1 to 17.

20. A computer program product having computer code stored thereon, the code, when executed by a processor, causes the processor to implement a method recited in any of claims 1 to 17.

21. A computer readable medium having a bitstream stored thereupon, the bitstream being generated by a method recited in any of claims 1 to 17.

22. A method of generating a bitstream, comprising: generating a bitstream using one or more of claims 1 to 17 and writing the bitstream to a computer-readable medium.

23. A method, an apparatus, or a system described in the present document.

The following documents are incorporated by reference in their entirety:

[1] Johannes Balld, Valero Laparra, and Eero P Simoncelli, "End-to-end optimization of nonlinear transform codes for perceptual quality," PCS IEEE (2016), 1-5.

[2] Lucas Theis, Wenzhe Shi, Andrew Cunningham, and Ferenc HuszAr, "Lossy image compression with compressive autoencoders," arXiv preprint arXiv: 1703.00395 (2017).

[3] Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247.

[4] Yuanying Dai, Dong Liu, and Feng Wu, "A convolutional neural network approach for post-processing in HEVC intra coding," MMM. Springer, 28-39.

[5] Rui Song, Dong Liu, Houqiang Li, and Feng Wu, "Neural network-based arithmetic coding of intra prediction modes in HEVC," VCIP IEEE (2017), 1-4.

[6] J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document

What is claimed is:

1. A method of processing video data, comprising:
determining, in real time, padding dimensions for padding samples to be applied to a video unit of a video for in-loop filtering, wherein $d_1$, $d_2$, $d_3$, and $d_4$ represent the padding dimensions corresponding to top, bottom, left, and right boundaries of the video unit, respectively; and
performing a conversion between the video unit and a bitstream of the video based on the padding dimensions that were determined,
wherein at least one of the padding dimensions is based on a size of the video unit, a color format, a channel type, a slice type, or a partitioning tree type, and
wherein a padding method used to generate the padding samples outside the video unit is based on the channel type, the slice type, or on which temporal layer the video unit belongs to, and wherein a neural network (NN) filter is applied to the padding samples.

2. The method of claim 1, wherein $d_1$, $d_2$, $d_3$, and $d_4$ each have a different value, wherein $d_1$, $d_2$, $d_3$, and $d_4$ each have a same value, or wherein $d_1=d_2$ and $d_3=d_4$.

3. The method of claim 1, wherein one or more indications corresponding to the padding dimensions are included in the bitstream.

4. The method of claim 1, wherein at least one of the padding dimensions is based on which temporal layer the video unit belongs to, or is based on reference picture information.

5. The method of claim 1, wherein at least one of the padding dimensions is based on a type of neural network (NN) in-loop filtering method applied to the video unit or whether the NN in-loop filtering method is applied to the video unit.

6. The method of claim 1, wherein the video unit has a video unit size dependent on at least one of a slice resolution and a quantization parameter (QP), and wherein a parent video unit is a slice.

7. The method of claim 1, wherein the padding dimensions define a padding area around the video unit, and wherein the method further comprises padding the padding area with the padding samples when at least one neighboring sample outside the video unit is unavailable.

8. The method of claim 1, further comprising padding a boundary of the video unit with the padding samples when neighboring samples outside the video unit and along the boundary are unavailable.

9. The method of claim 1, wherein the padding dimensions define a padding area around the video unit, and wherein the method further comprises padding the padding area using a padding method comprising zero padding, reflection padding, replication padding, constant padding, or mirror padding.

10. The method of claim 9, wherein the padding method used for padding the padding area is based on the size of the video unit.

11. The method of claim 1, wherein the padding method used to generate the padding samples outside the video unit is based on a type of neural network (NN) filtering method applied to the video unit, or based on whether the NN filtering method is applied to the video unit.

12. The method of claim 1, wherein a granularity of a neural network (NN) filter model to be applied to the padding samples is pre-defined, included in a bitstream, derived, or based on a dimension of the video unit.

13. The method of claim 1, wherein a granularity of a neural network (NN) filter model to be applied to the padding samples is based on a quantization parameter (QP) and a resolution of the video unit.

14. The method of claim 1, wherein binarization of a neural network (NN) filter model index corresponding to the NN filter model to be applied to the padding samples is based on a maximum number allowed for a level higher than the video unit, wherein the level higher is a slice, a picture, or a sequence level, and wherein the NN filter model index is binarized as truncated unary code or truncated binary code.

15. The method of claim 1, wherein the conversion includes encoding the video unit into the bitstream.

16. The method of claim 1, wherein the conversion includes decoding the video unit from the bitstream.

17. The method of claim 1, wherein at least one of the padding dimensions is based on a location of the video unit relative to a parent video unit that was partitioned to obtain the video unit.

18. An apparatus for processing video data comprising a processor and a non-transitory memory with instructions thereon, wherein the instructions upon execution by the processor, cause the processor to:
    determine, in real time, padding dimensions for padding samples to be applied to a video unit of a video for in-loop filtering, wherein $d_1$, $d_2$, $d_3$, and $d_4$ represent the padding dimensions corresponding to top, bottom, left, and right boundaries of the video unit, respectively; and
    perform a conversion between the video unit and a bitstream of the video based on the padding dimensions that were determined,
    wherein at least one of the padding dimensions is based on a size of the video unit, a color format, a channel type, a slice type, or a partitioning tree type, and
    wherein a padding method used to generate the padding samples outside the video unit is based on the channel type, the slice type, or on which temporal layer the video unit belongs to, and wherein a neural network (NN) filter is applied to the padding samples.

19. A method for storing a bitstream of a video, comprising:
    determining, in real time, padding dimensions for padding samples to be applied to a video unit of the video for in-loop filtering, wherein $d_1$, $d_2$, $d_3$, and $d_4$ represent the padding dimensions corresponding to top, bottom, left, and right boundaries of the video unit, respectively;
    generating the bitstream based on the padding dimensions that were determined; and
    storing the bitstream in a non-transitory computer-readable recording medium,
    wherein at least one of the padding dimensions is based on a size of the video unit, a color format, a channel type, a slice type, or a partitioning tree type, and
    wherein a padding method used to generate the padding samples outside the video unit is based on the channel type, the slice type, or on which temporal layer the video unit belongs to, and wherein a neural network (NN) filter is applied to the padding samples.

* * * * *